United States Patent [19]
Abel et al.

[11] Patent Number: 5,991,787
[45] Date of Patent: Nov. 23, 1999

[54] REDUCING PEAK SPECTRAL ERROR IN INVERSE FAST FOURIER TRANSFORM USING MMX™ TECHNOLOGY

[75] Inventors: James Abel; Michael A. Julier, both of Phoenix, Ariz.

[73] Assignee: Intel Corporation, Santa Clara, Calif.

[21] Appl. No.: 09/002,292

[22] Filed: Dec. 31, 1997

[51] Int. Cl.$^6$ ......................................... G06F 15/00
[52] U.S. Cl. ............................. 708/400; 708/403
[58] Field of Search ................................ 708/400, 401, 708/402, 403, 404, 405, 406, 407, 408, 409

[56] References Cited

U.S. PATENT DOCUMENTS

| | | | |
|---|---|---|---|
| 4,689,762 | 8/1987 | Thibbodeau, Jr. .................. | 364/726 |
| 4,768,159 | 8/1988 | Gray et al. ........................ | 364/726 |
| 4,970,674 | 11/1990 | White ............................... | 364/726 |
| 5,029,079 | 7/1991 | Magar et al. ...................... | 364/200 |
| 5,163,017 | 11/1992 | Wong et al. ....................... | 364/726 |
| 5,233,551 | 8/1993 | White ............................... | 364/726 |
| 5,313,413 | 5/1994 | Bhatia et al. ...................... | 364/726 |
| 5,371,696 | 12/1994 | Sundararajan et al. ............. | 364/726 |
| 5,428,567 | 6/1995 | Horvath et al. .................... | 365/78 |
| 5,473,556 | 12/1995 | Aguilar et al. ..................... | 364/726 |
| 5,491,652 | 2/1996 | Luo et al. .......................... | 364/726 |
| 5,633,817 | 5/1997 | Verhenne et al. .................. | 364/726 |
| 5,835,392 | 11/1998 | Dulong et al. ..................... | 708/404 |

OTHER PUBLICATIONS

Tran–Thong and Bede Lui, "Fixed–Point Fast Fourier Transform Error Analysis," IEEE Transactions on Acoustics, Speech and Signal Processing, vol. ASSP–24, No. 6, Dec. 1976, pp. 563–573.

John P. Princen and Alan Bernard Bradley, "Analysis/Synthesis Filter Bank Design Based on Time Domain Aliasing Cancellation," IEEE Transactions on Acoustics, Speech and Signal Processing, vol. ASSP–34, No. 5, Oct. 1986, pp. 1153–1161.

Grant Davidson, Wallace Anderson and Al Lovrich, "A Low–Cost Adaptive Tranform Decoder Implementation for High–Quality Audio," 1992 IEEE International Conference on Acoustics, Speech and Signal Processing: Speech Processing 2, Audio, Neural Networks, Underwater Acoustics, Mar. 1992, vol. II, pp. 193–196.

Dragutin Sevie and Miodrag Popovie, "A New Efficient Implementation of the Oddly Stacked Princen–Bradley Filter Bank," IEEE Signal Processing Letters, vol. 1, No. 11, Nov. 1994, pp. 166–168.

James C. Abel and Michael A. Julier, Intel Technology Journal, "Implementation of a High–Wuality Dolby Digital Decode Using MMX™ Technology," http://developer.intel-.com/technology/itj/q31997/articles/art_3.htm, Jun. 1997.

*Primary Examiner*—Chuong Dinh Ngo
*Attorney, Agent, or Firm*—Blakely, Sokoloff, Taylor & Zafman LLP

[57] ABSTRACT

A method for computing a decimation-in-time Fast Fourier Transform of a sample is provided, the method including inputting first 2B-bit values representing the sample into a radix-4 first section of the decimation-in-time Fast Fourier Transform and performing first complex 2B-bit integer additions and subtractions on the first 2B-bit values to form second 2B-bit values, without performing a multiplication. The method also includes rounding the second 2B-bit values to form B-bit values output from the radix-4 first section of the decimation-in-time Fast Fourier Transform.

36 Claims, 15 Drawing Sheets

REDUCING PEAK SPECTRAL ERROR IN INVERSE FAST FOURIER TRANSFORM USING MMX™ TECHNOLOGY

BACKGROUND OF THE INVENTION

1. Field of the Invention

This invention relates generally to digital signal processing, and in particular to methods for carrying out an inverse Fast Fourier Transform.

2. Description of the Related Art

Quantization noise in an Inverse Fast Fourier Transform (IFFT) used, for example, in digital signal processing (DSP), can result in an output that contains errors having relatively large spectral peaks, when analyzed in the spectral domain. Such quantization noise in the IFFT used in DSP is especially noticeable for low-level signals. For example, for audio signals, the quantization noise can result in an audible tonal noise that can be objectionable.

Typically, the IFFT used in DSP is performed using the same data type throughout, for example, B-bit data. When the IFFT used in DSP is implemented using either dedicated digital signal processors or general purpose digital computer processors with a finite word length, quantization noise will appear in the output. If the quantization noise is too large, typical corrective actions include: 1) increasing the word length or size, for example, to accommodate 2B-bit data, thus reducing the quantization error and/or 2) using floating-point representations instead of using fixed point representations. However, increasing word length and/or using floating-point representations can significantly increase circuit size and complexity and/or program execution time and/or required data storage.

The Fast Fourier Transform (FFT) is a well known algorithm used in DSP for transforming a set of N time-domain sample points into a corresponding set of N frequency-domain sample points. The FFT processes find utility in a variety of applications, including machine-implemented speech recognition, image enhancement or video or tomography signals, adaptive filtering of digitized waveforms, audio compression and so forth.

The basic FFT equations are:

$$X(p) = \sum_{n=0}^{N-1} x(n) W_N^{np}; \text{ for } p = 0, 1, 2, \ldots, N-1$$

and $$W_N^{np} = \exp\left(\frac{-(2\pi)jnp}{N}\right) = \cos\left(\frac{2\pi np}{N}\right) - j\sin\left(\frac{2\pi np}{N}\right)$$

where $j=\sqrt{(-1)}$ so that $j^2=-1$, $j^3=-j$ and $j^4=+1$. The time-domain samples are represented as $x(0)$ through $x(N-1)$. The frequency-domain samples are represented as $X(0)$ through $X(N-1)$.

The basic FFT equations show that each frequency-domain component $X(p)$ is a weighted sum of all N time-domain components $x(n)$, for $n=0, 1, 2, \ldots, N-1$. The weights $W_N^{np}$ are referred to as twiddle factors.

The basic IFFT equations are:

$$x(n) = \frac{1}{N}\sum_{p=0}^{N-1} X(p) W_N^{-np} = \frac{1}{N}\left[\sum_{p=0}^{N-1} X^*(p) W_N^{np}\right]^*;$$

for $n = 0, 1, 2, \ldots, N-1$ and $$W_N^{-np} = \exp\left(\frac{+(2\pi)jnp}{N}\right) = \cos\left(\frac{2\pi np}{N}\right) + j\sin\left(\frac{2\pi np}{N}\right) = [W_N^{np}]^*$$

where $z^*=x-jy$ is the complex conjugate of $z=x+jy$. The basic IFFT equations show that each time-domain component $x(n)$ is a weighted average of all N frequency-domain components $X(p)$, for $p=0, 1, 2, \ldots, N-1$. The weights $W_N^{-np}=[W_N^{np}]^*$ for the IFFT are the complex conjugates of the twiddle factors $W_N^{np}$ for the FFT. The expression in the brackets in the second equation for each time-domain component $x(n)$ is recognizable as the FFT of the sequence $\{X^*(p)\}$ (for $p=0, 1, 2, \ldots, N-1$), the complex conjugate of the frequency-domain component sequence $\{X(p)\}$ (for $p=0, 1, 2, \ldots, N-1$). Thus, the IFFT for each time-domain component $x(n)$ can be computed by taking the complex conjugate of the FFT of the sequence $\{X^*(p)\}$ (for $p=0, 1, 2, \ldots, N-1$), and dividing by the number of points N.

The basic FFT equation $$X(p) = \sum_{k=0}^{N-1} x(k) W_N^{kp},$$

for $p=0, 1, 2, \ldots, N-1$, can be inserted into the basic IFFT equation $$x(n) = \frac{1}{N}\sum_{p=0}^{N-1} X(p) W_N^{-np},$$

for $n=0, 1, 2, \ldots, N-1$, to give:

$$x(n) = \frac{1}{N}\sum_{p=0}^{N-1}\left[\sum_{k=0}^{N-1} x(k) W_N^{kp}\right] W_N^{-np} =$$

$$\frac{1}{N}\sum_{k=0}^{N-1} x(k)\left[\sum_{p=0}^{N-1} W_N^{(k-n)p}\right] = \frac{1}{N}\sum_{k=0}^{N-1} x(k)[N\delta_{kn}] = x(n),$$

where $$\sum_{p=0}^{N-1} W_N^{(k-n)p} = \sum_{p=0}^{N-1}\left(\exp\left(\frac{-j2\pi(k-n)}{N}\right)\right)^p$$

$$= \frac{1 - \left(\exp\left(\frac{-j2\pi(k-n)}{N}\right)\right)^N}{1 - \left(\exp\left(\frac{-j2\pi(k-n)}{N}\right)\right)}$$

$$= \frac{1 - (\exp(-j2\pi(k-n)))}{1 - \left(\exp\left(\frac{-j2\pi(k-n)}{N}\right)\right)}$$

$$= 0$$

for $k \neq n$, and $\sum_{p=0}^{N-1} W_N^{(k-n)p} = N$, for $k = n$.

In other words, $$\sum_{p=0}^{N-1} W_N^{(k-n)p} = N\delta_{kn},$$

where $\delta_{kn}$ is the Kronecker delta.

Similarly, the basic IFFT equation $$x(n) = \frac{1}{N}\sum_{q=0}^{N-1} X(q) W_N^{-nq},$$

for n=0, 1, 2, ..., N−1, can be inserted into the basic FFT equation $$X(p) = \sum_{n=0}^{N-1} x(n) W_N^{np},$$

for p=0, 1, 2, ..., N−1, to give:

$$X(p) = \sum_{n=0}^{N-1}\left[\frac{1}{N}\sum_{q=0}^{N-1} X(q) W_N^{-nq}\right] W_N^{np} =$$

$$\frac{1}{N}\sum_{q=0}^{N-1} X(q)\left[\sum_{n=0}^{N-1} W_N^{(p-q)n}\right] = \frac{1}{N}\sum_{q=0}^{N-1} X(q)[N\delta_{pq}] = X(p).$$

Thus, the FFT and IFFT are, indeed, an invertible transform pair.

Machine-implemented computation of an FFT is often simplified by cascading together a series of simple multiply-and-add sections. When a recursive process is used, data circulates through a single section and the computational structure of the section is made variable for each circulation. Each circulation through the section is referred to as a "pass". When the number N of time-domain and frequency-domain sample points satisfies the relation N=$2^M$, where M is a positive integer, then the number M is typically referred to as the number of "stages" of the FFT.

A plurality of computational elements, each known as a radix-r butterfly, may be assembled to define a single section of the FFT for carrying out a particular pass. A radix-r butterfly receives r input signals and produces a corresponding number of r output signals, where each output signal is the weighted sum of the r input signals. The radix number, r, in essence, defines the number of input components that contribute to each output component.

By way of example, as shown in FIG. 1, a radix-2 butterfly for a decimation-in-time (DIT) FFT receives two input signals A and B and produces two output signals X and Y so that X=A+$W_N^k$B and Y=A−$W_N^k$B, where $$W_N^k = \exp\left(\frac{-(2\pi)jk}{N}\right) = \cos\left(\frac{2\pi k}{N}\right) - j\sin\left(\frac{2\pi k}{N}\right),$$

and the k on the arrow heading into the open circle shown in FIG. 1 represents the exponent of the twiddle factor $W_N^k$. Each output signal X=A+$W_N^k$B and Y=A−$W_N^k$B is the weighted sum of the two input signals A and B.

As shown in FIG. 2, a radix-4 butterfly for a DIT FFT receives four input signals A, B, C and D and produces four output signals X, Y, Z and V so that X=A+$W_N^k$B+$W_N^l$C+ $W_N^m$D, Y=A−j$W_N^k$B−$W_N^l$C+j$W_N^m$D, Z=A−$W_N^k$B+$W_N^l$C− $W_N^m$D and V=A+j$W_N^k$B−$W_N^l$C−j$W_N^m$D, where $$W_N^k = \exp\left(\frac{-(2\pi)jk}{N}\right) = \cos\left(\frac{2\pi k}{N}\right) - j\sin\left(\frac{2\pi k}{N}\right),$$

$$W_N^l = \exp\left(\frac{-(2\pi)jl}{N}\right) = \cos\left(\frac{2\pi l}{N}\right) - j\sin\left(\frac{2\pi l}{N}\right) \text{ and}$$

$$W_N^m = \exp\left(\frac{-(2\pi)jm}{N}\right) = \cos\left(\frac{2\pi m}{N}\right) - j\sin\left(\frac{2\pi m}{N}\right),$$

and the k, l and m on the arrows heading into the open circle shown in FIG. 2 represent the exponents of the twiddle factors $W_N^k$, $W_N^l$ and $W_N^m$. Each output signal X=A+$W_N^k$B+$W_N^l$C+ $W_N^m$D, Y=A−j$W_N^k$B−$W_N^l$C+j$W_N^m$D, Z=A−$W_N^k$B+$W_N^l$C− $W_N^m$D and V=A+j$W_N^k$B−$W_N^l$C−j$W_N^m$D is the weighted sum of the four input signals A, B, C and D.

Completion of an N-point FFT requires that the product of the butterfly radix values, taken over the total number of sections or passes, equals the total point count, N. Thus, a 64-point FFT (constituting 6 stages since 64=$2^6$) can be performed by one section (constituting all 6 stages at once) having 1 radix-64 butterfly or two cascaded sections (each constituting 3 stages) where each section has 8 radix-8 butterflies (the product of the radix values for section-1 and section-2 is 8×8=64) or three cascaded sections (each constituting 2 stages) where each section has 16 radix-4 butterflies (the product of the radix values for section-1, section-2 and section-3 is 4×4×4=64) or six cascaded sections (each constituting 1 stage) where each section (or stage) has 32 radix-2 butterflies (the product of the radix values for section-1 through section-6 is 2×2×2×2×2×2=64).

It has been shown that multi-section or multi-pass FFT processes can be correctly carried out under conditions where the number of butterfly elements changes from one pass or section to the next and the corresponding radix value $r_i$ (of the butterfly elements of section-i) also changes accordingly from one pass or section to the next. A mixed-radix system is one where the radix value $r_i$ (of the butterfly elements of section-i) is different from at least one radix value $r_k$ (of the butterfly elements of section-k) for i≠k.

An advantage of a mixed-radix computing system is that it can be "tuned" to optimize the signal-to-noise ratio of the FFT and/or to minimize the accumulated round-off error of the total FFT for each particular set of circumstances. By way of example, it may be advantageous in one environment to perform a 64-point FFT using the mixed-radix sequence: 2, 4, 4, 2. In a different environment, it may be more advantageous to use the mixed-radix sequence: 4, 2, 4, 2. Round-off error varies within a machine of finite precision as a function of radix value and the peak signal magnitudes that develop in each section or pass.

The Cooley-Tukey algorithm, as described in E. Oran Brigham, *The Fast Fourier Transform,* Prentice-Hall, Englewood Cliffs, N.J., 1974, pp. 188–190, provides an N-point DIT FFT for arbitrary radix where N=$r_1 r_2 \ldots r_m$, where $r_1$, $r_2, \ldots, r_m$ are all integer valued. Expressing the indices n and p in a variable radix representation:

$$p = p_{m-1}(r_1 r_2 \ldots r_{m-1}) + p_{m-2}(r_1 r_2 \ldots r_{m-2}) + \ldots + p_2 r_{12} + p_1 r_1 + p_0$$

$$n = n_{m-1}(r_2 r_3 \ldots r_m) + n_{m-2}(r_3 r_4 \ldots r_m) + \ldots + n_2 r_{m-1} r_m + n_1 r_m + n_0$$
where $p_{i-1}$=0,1,2, ..., $r_i$−1; 1≤i≤m and $n_i$=0,1,2, ..., $r_{m-i}$− 1; 0≤i≤m−1, the basic FFT equation $$X(p) = \sum_{n=0}^{N-1} x(n) W_N^{np},$$

for p=0, 1, 2, . . . , N−1, becomes:

$$X(p_{m-1}, p_{m-2}, \ldots, p_2, p_1, p_0) = \sum_{n_0=0}^{r_m-1} \sum_{n_1=0}^{r_{m-1}-1} \sum_{n_2=0}^{r_{m-2}-1} \cdots \sum_{n_{m-2}}^{r_2-1} \sum_{n_{m-1}=0}^{r_1-1} x(n_0, n_1, n_2, \ldots, n_{m-2}, n_{m-1}) W_N^{np},$$

where the time-domain samples x(n) are presented in digit-reversed order so that the resulting frequency-domain samples X(p) will be in natural digit order. Since $$W_N^{np} = \left(\exp\left(\frac{-(2\pi)j}{N}\right)\right)^{p[n_{m-1}(r_2 r_3 \cdots r_m) + n_{m-2}(r_3 r_4 \cdots r_m) + \cdots + n_2(r_{m-1} r_m) + n_1(r_m) + n_0]}$$

and $$\left(\exp\left(\frac{-(2\pi)j}{N}\right)\right)^{p[n_{m-1}(r_2 r_3 \cdots r_m)]} = \left(\exp\left(\frac{-(2\pi)j}{N}\right)\right)^{[p_{m-1}(r_1 r_2 \cdots r_{m-1}) + p_{m-2}(r_1 r_2 \cdots r_{m-2}) + \cdots + p_2(r_1 r_2) + p_1(r_1) + p_0]n_{m-1}(r_2 r_3 \cdots r_m)}$$

where $$\left(\exp\left(\frac{-(2\pi)j}{N}\right)\right)^{[p_{m-1}(r_1 r_2 \cdots r_{m-1}) + p_{m-2}(r_1 r_2 \cdots r_{m-2}) + \cdots + p_2(r_1 r_2) + p_1(r_1) + p_0]n_{m-1}(r_2 r_3 \cdots r_m)} =$$

$$\left(\exp\left(\frac{-(2\pi)j}{(r_1 r_2 \ldots r_m)}\right)\right)^{(r_1 r_2 \cdots r_m)[p_{m-1}(r_2 r_3 \cdots r_{m-1}) + p_{m-2}(r_2 r_3 \cdots r_{m-2}) + \cdots + p_2(r_2) + p_1]n_{m-1}} \left(\exp\left(\frac{-(2\pi)j}{(r_1 r_2 \ldots r_m)}\right)\right)^{p_0 n_{m-1}(r_2 r_3 \cdots r_m)} =$$

$$\left(\exp\left(\frac{-(2\pi)j}{(r_1 r_2 \ldots r_m)}\right)\right)^{p_0 n_{m-1}(r_2 r_3 \cdots r_m)} = \left(\exp\left(\frac{-(2\pi)j}{r_1}\right)\right)^{p_0 n_{m-1}}$$

using $$N = r_1 r_2 \cdots r_m \text{ and}$$

$$W_N^{Ns} = \exp\left(\frac{-(2\pi)jNs}{N}\right) = \cos\left(\frac{2\pi Ns}{N}\right) - j\sin\left(\frac{2\pi Ns}{N}\right) = \cos(2\pi s) = 1,$$

for any integer s, then $$X(p_{m-1}, p_{m-2}, \ldots, p_2, p_1, p_0) = \sum_{n_0=0}^{r_m-1} \sum_{n_1=0}^{r_{m-1}-1} \sum_{n_2=0}^{r_{m-2}-1} \cdots \sum_{n_{m-2}}^{r_2-1} \sum_{n_{m-1}=0}^{r_1-1} x(n_0, n_1, n_2, \ldots, n_{m-2}, n_{m-1}) W_N^{np}$$

$$= \sum_{n_0=0}^{r_m-1} \sum_{n_1=0}^{r_{m-1}-1} \sum_{n_2=0}^{r_{m-2}-1} \cdots \sum_{n_{m-2}}^{r_2-1} \sum_{n_{m-1}=0}^{r_1-1} x(n_0, n_1, n_2, \ldots,$$

$$n_{m-2}, n_{m-1})\left(\exp\left(\frac{-(2\pi)j}{N}\right)\right)^{p[n_{m-1}(r_2 r_3 \cdots r_m) + n_{m-2}(r_3 r_4 \cdots r_m) + \cdots + n_2(r_{m-1} r_m) + n_1(r_m) + n_0]}$$

$$= \sum_{n_0=0}^{r_m-1} \cdots \sum_{n_{m-2}}^{r_2-1} \sum_{n_{m-1}=0}^{r_1-1} x(n_0, n_1, n_2, \ldots,$$

$$n_{m-2}, n_{m-1})\left(\exp\left(\frac{-(2\pi)j}{r_1}\right)\right)^{p_0 n_{m-1}} \left(\exp\left(\frac{-(2\pi)j}{N}\right)\right)^{p[n_{m-2}(r_3 r_4 \cdots r_m) + \cdots + n_2(r_{m-1} r_m) + n_1(r_m) + n_0]}$$

$$= \sum_{n_0=0}^{r_m-1} \cdots \sum_{n_{m-2}}^{r_2-1} \left[\sum_{n_{m-1}=0}^{r_1-1} x(n_0, n_1, n_2, \ldots,\right.$$

$$\left. n_{m-2}, n_{m-1})\left(\exp\left(\frac{-(2\pi)j}{r_1}\right)\right)^{p_0 n_{m-1}}\right]\left(\exp\left(\frac{-(2\pi)j}{N}\right)\right)^{p[n_{m-2}(r_3 r_4 \cdots r_m) + \cdots + n_2(r_{m-1} r_m) + n_1(r_m) + n_0]}$$

$$= \sum_{n_0=0}^{r_m-1} \sum_{n_1=0}^{r_{m-1}-1} \sum_{n_2=0}^{r_{m-2}-1} \cdots \sum_{n_{m-2}}^{r_2-1} [x_1(n_0, n_1, n_2, \ldots,$$

$$n_{m-2}, p_0)]\left(\exp\left(\frac{-(2\pi)j}{N}\right)\right)^{p[n_{m-2}(r_3 r_4 \cdots r_m) + \cdots + n_2(r_{m-1} r_m) + n_1(r_m) + n_0]}$$

where the brackets define the first section of the N-point DIT FFT:

$$x_1(n_0, n_1, n_2, \ldots, n_{m-2}, p_0) = \sum_{n_{m-1}=0}^{r_1-1} x(n_0, n_1, n_2, \ldots, n_{m-2}, n_{m-1}) \left(\exp\left(\frac{-(2\pi)j}{r_1}\right)\right)^{p_0 n_{m-1}}. \quad 5$$

Similarly, since $$\left(\exp\left(\frac{-(2\pi)j}{N}\right)\right)^{p[n_{m-2}(r_3 r_4 \cdots r_m)]} = \left(\exp\left(\frac{-(2\pi)j}{N}\right)\right)^{[p_{m-1}(r_1 r_2 \cdots r_{m-1}) + p_{m-2}(r_1 r_2 \cdots r_{m-2}) + \cdots + p_2(r_1 r_2) + p_1(r_1) + p_0]n_{m-2}(r_3 r_4 \cdots r_m)}$$

where $$\left(\exp\left(\frac{-(2\pi)j}{N}\right)\right)^{[p_{m-1}(r_1 r_2 \cdots r_{m-1}) + p_{m-2}(r_1 r_2 \cdots r_{m-2}) + \cdots + p_2(r_1 r_2) + p_1(r_1) + p_0]n_{m-2}(r_3 r_4 \cdots r_m)} =$$

$$\left(\exp\left(\frac{-(2\pi)j}{(r_1 r_2 \cdots r_m)}\right)\right)^{(r_1 r_2 \cdots r_m)[p_{m-1}(r_3 r_4 \cdots r_{m-1}) + p_{m-2}(r_3 r_4 \cdots r_{m-2}) + \cdots + p_3(r_3) + p_2]n_{m-2}} \left(\exp\left(\frac{-(2\pi)j}{(r_1 r_2 \cdots r_m)}\right)\right)^{[p_1(r_1) + p_0]n_{m-2}(r_3 r_4 \cdots r_m)} =$$

$$\left(\exp\left(\frac{-(2\pi)j}{(r_1 r_2 \cdots r_m)}\right)\right)^{[p_1(r_1) + p_0]n_{m-2}(r_3 r_4 \cdots r_m)} = \left(\exp\left(\frac{-(2\pi)j}{r_1 r_2}\right)\right)^{[p_1(r_1) + p_0]n_{m-2}}$$

25 again using $$N = r_1 r_2 \cdots r_m \text{ and}$$

$$W_N^{Ns} = \exp\left(\frac{-(2\pi)jNs}{N}\right) = \cos\left(\frac{2\pi Ns}{N}\right) - j\sin\left(\frac{2\pi Ns}{N}\right) = \cos(2\pi s) = 1, \quad 30$$

for any integer s, then $$X(p_{m-1}, p_{m-2}, \ldots, p_2, p_1, p_0) = \sum_{n_0=0}^{r_m-1} \sum_{n_1=0}^{r_{m-1}-1} \sum_{n_2=0}^{r_{m-2}-1} \cdots \sum_{n_{m-2}=0}^{r_2-1} \sum_{n_{m-1}=0}^{r_1-1} x(n_0, n_1, n_2, \ldots, n_{m-2}, n_{m-1}) W_N^{np}$$

$$= \sum_{n_0=0}^{r_m-1} \sum_{n_1=0}^{r_{m-1}-1} \sum_{n_2=0}^{r_{m-2}-1} \cdots \sum_{n_{m-3}=0}^{r_3-1} \sum_{n_{m-2}=0}^{r_2-1} x_1(n_0, n_1, n_2, \ldots,$$

$$n_{m-2}, p_0) \left(\exp\left(\frac{-(2\pi)j}{N}\right)\right)^{p[n_{m-2}(r_3 r_4 \cdots r_m) + n_{m-3}(r_4 r_5 \cdots r_m) + \cdots + n_2(r_{m-1} r_m) + n_1(r_m) + n_0]}$$

$$= \sum_{n_0=0}^{r_m-1} \cdots \sum_{n_{m-3}=0}^{r_3-1} \sum_{n_{m-2}=0}^{r_2-1} x_1(n_0, n_1, n_2, \ldots,$$

$$n_{m-2}, p_0) \left(\exp\left(\frac{-(2\pi)j}{r_1 r_2}\right)\right)^{[p_1(r_1) + p_0]n_{m-2}} \left(\exp\left(\frac{-(2\pi)j}{N}\right)\right)^{p[n_{m-3}(r_4 r_5 \cdots r_m) + \cdots + n_2(r_{m-1} r_m) + n_1(r_m) + n_0]}$$

$$= \sum_{n_0=0}^{r_m-1} \cdots \sum_{n_{m-3}=0}^{r_3-1} \left[\sum_{n_{m-2}=0}^{r_2-1} x_1(n_0, n_1, n_2, \ldots,\right.$$

$$\left. n_{m-2}, p_0) \left(\exp\left(\frac{-(2\pi)j}{r_1 r_2}\right)\right)^{[p_1(r_1) + p_0]n_{m-2}}\right] \left(\exp\left(\frac{-(2\pi)j}{N}\right)\right)^{p[n_{m-3}(r_4 r_5 \cdots r_m) + \cdots + n_2(r_{m-1} r_m) + n_1(r_m) + n_0]}$$

$$= \sum_{n_0=0}^{r_m-1} \sum_{n_1=0}^{r_{m-1}-1} \sum_{n_2=0}^{r_{m-2}-1} \cdots \sum_{n_{m-3}=0}^{r_3-1} [x_2(n_0, n_1, n_2, \ldots,$$

$$n_{m-3}, p_1, p_0)] \left(\exp\left(\frac{-(2\pi)j}{N}\right)\right)^{p[n_{m-3}(r_4 r_5 \cdots r_m) + \cdots + n_2(r_{m-1} r_m) + n_1(r_m) + n_0]}$$

65 where the brackets define the second section of the N-point DIT FFT:

$$x_2(n_0, n_1, n_2, \ldots, n_{m-3}, p_1, p_0) = \sum_{n_{m-2}=0}^{r_2-1} x_1(n_0, n_1, n_2, \ldots, n_{m-2}, p_0)\left(\exp\left(\frac{-(2\pi)j}{r_1 r_2}\right)\right)^{[p_1(r_1)+p_0]n_{m-2}}.$$

Generally the kth section of the N-point DIT FFT is defined, for $2 \leq k \leq m-1$, as follows:

$$x_k(n_0, n_1, n_2, \ldots, n_{m-k-1}, p_{k-1}, p_{k-2}, \ldots, p_2, p_1, p_0) = \sum_{n_{m-k}=0}^{r_k-1} x_{k-1}(n_0, n_1, \ldots, n_{m-k}, p_{k-2}, p_{k-1}, \ldots, p_1, p_0)$$

$$\left(\exp\left(\frac{-(2\pi)j}{r_1 r_2 \cdots r_k}\right)\right)^{[p_{k-1}(r_1 r_2 \cdots r_{k-1})+p_{k-2}(r_1 r_2 \cdots r_{k-2})+\cdots+p_2(r_1 r_2)+p_1(r_1)+p_0]n_{m-k}}$$

so that, for example, the third section of the N-point DIT FFT is:

$$x_3(n_0, n_1, \ldots, n_{m-4}, p_2, p_1, p_0) = \sum_{n_{m-3}=0}^{r_3-1} x_2(n_0, n_1, \ldots, n_{m-3}, p_1, p_0)\left(\exp\left(\frac{-(2\pi)j}{r_1 r_2 r_3}\right)\right)^{[p_2(r_1 r_2)+p_1(r_1)+p_0]n_{m-3}},$$

and $$X(p_{m-1}, p_{m-2}, p_{m-3}, \ldots, p_2, p_1, p_0) = x_m(p_{m-1}, p_{m-2}, p_{m-3}, \ldots, p_2, p_1, p_0) =$$

$$\sum_{n_0=0}^{r_m-1} x_{m-1}(n_0, p_{m-2}, p_{m-3}, \ldots, p_1, p_0)\left(\exp\left(\frac{-(2\pi)j}{r_1 r_2 \cdots r_m}\right)\right)^{[p_{m-1}(r_1 r_2 \cdots r_{m-1})+p_{m-2}(r_1 r_2 \cdots r_{m-2})+p_{m-3}(r_1 r_2 \cdots r_{m-3})+\cdots+p_3(r_1 r_2 r_3)+p_2(r_1 r_2)+p_1(r_1)+p_0]n_0} =$$

$$\sum_{n_0=0}^{r_m-1} x_{m-1}(n_0, p_{m-2}, p_{m-3}, \ldots, p_1, p_0)\left(\exp\left(\frac{-(2\pi)j}{N}\right)\right)^{p n_0} = \sum_{n_0=0}^{r_m-1} x_{m-1}(n_0, p_{m-2}, p_{m-3}, \ldots, p_1, p_0) W_N^{p n_0}$$

is the mth and final section of the N-point DIT FFT.

For example, the N-point DIT FFT for $N=r_1$, where $r_1$ is integer valued, becomes:

$$X(p_0) = \sum_{n_0=0}^{r_1-1} x(n_0) W_{r_1}^{n_0 p_0},$$

which, for $r_1=2$ is just the radix-2 butterfly for a DIT FFT, as shown in FIG. 1, with k=0, A=x(0), B=x(1), X=X(0) and Y=X(1). Similarly, for $r_1=4$, $$X(p_0) = \sum_{n_0=0}^{r_1-1} x(n_0) W_{r_1}^{n_0 p_0}$$

is just the radix-4 butterfly for a DIT FFT, as shown in FIG. 2, with k=l=m=0, A=x(0), B=x(1), C=x(2), D=x(3), X=X(0), Y=X(1), Z=X(2) and V=X(3).

Likewise, the N-point DIT FFT for $N=r_1 r_2$, where $r_1$ and $r_2$ are integer valued, becomes:

$$x_1(n_0, p_0) = \sum_{n_1=0}^{r_1-1} x(n_0, n_1) W_{r_1}^{n_1 p_0} \text{ and}$$

$$X(p_1, p_0) = x_2(p_1, p_0) = \sum_{n_0=0}^{r_2-1} x_1(n_0, p_0) W_{r_1 r_2}^{[p_1(r_1)+p_0]n_0},$$

which, for $r_1=2=r_2$, is given by just two stages of 2 radix-2 butterflies each, as shown in FIG. 3. Expanded out, the 4-point DIT FFT, for $N=2^2$, is given by:

$X(00)=x_2(00)=x_1(00)+x_1(10)=[x(00)+x(10)]+[x(01)+x(11)]$, $X(01)=x_2(01)=x_1(01)+(W_4)^1 x_1(11)=[x(00)-x(10)]+(W_4)^1[x(01)-x(11)]$, $X(10)=x_2(10)=x_1(00)-x_1(10)=[x(00)+x(10)]-[x(01)+x(11)]$, $X(11)=x_2(11)=x_1(01)-(W_4)^1 x_1(11)=[x(00)-x(10)]-(W_4)^1[x(01)-x(11)]$, where the arguments of the time-domain samples x(n) and the frequency-domain samples X(p) are presented in binary form, $n_1 n_0$ and $p_1 p_0$. As shown in FIG. 3, the time-domain samples x(n) are input to the radix-2 first stage in (binary) digit-reversed order (reversed-binary order), {00,10,01,11}, while the frequency-domain samples X(p) are output from the final radix-2 stage (the second stage, in this example) in natural (binary) digit order, {00,01,10,11}. A correspondence with the radix-4 butterfly for a DIT FFT, as shown in FIG. 2, with k=l=m=0, may be made with the identifications: A=x(00), B=x(01), C=x(10), D=x(11), X=X(00), Y=X(01), Z=X(10) and V=X(11).

The N-point DIT FFT for $N=r_1 r_2 r_3$, where $r_1$, $r_2$ and $r_3$ are integer valued, becomes:

$$x_1(n_0, n_1, p_0) = \sum_{n_2=0}^{r_1-1} x(n_0, n_1, n_2) W_{r_1}^{n_2 p_0},$$

-continued $$x_2(n_0, p_1, p_0) = \sum_{n_1=0}^{r_2-1} x_1(n_0, n_1, p_0) W_{r_1 r_2}^{[p_1(r_1)+p_0]n_1}, \text{ and}$$

$$X(p_2, p_1, p_0) = x_3(p_2, p_1, p_0)$$

$$= \sum_{n_0=0}^{r_3-1} x_2(n_0, p_1, p_0) W_{r_1 r_2 r_3}^{[p_2 p_1(r_1 r_2)+p_1(r_1)+p_0]n_0},$$

which, for $r_1=2=r_2=r_3$ is
given by three stages of 4 radix-2 butterflies each, as shown in FIG. 4. Expanded out, the 8-point DIT FFT, for N=$2^3$, is given by:

X(000)=$x_3$(000)=$x_2$(000)+$x_2$(100)=[$x_1$(000)+$x_1$(010)]+ [$x_1$(100)+$x_1$(110)]=[[x(000)+x(100)]+[x(010)+x(110)]]+[[x(001)+x(101)]+[x(011)+x(111)]],

X(001)=$x_3$(001)=$x_2$(001)+$(W_8)^1 x_2$(101)=[$x_1$(001)−j$x_1$(011)]+$(W_8)^1$[$x_1$(101)−j$x_1$(111)]=[[x(000)−x(100)]−j[x(010)−x(110)]]+$(W_8)^1$[[x(001)−x(101)]−j[x(011)−x(111)]],

X(010)=$x_3$(010)=$x_2$(010)+$(W_8)^2 x_2$(110)=[$x_1$(000)−$x_1$(010)]+$(W_8)^2$[$x_1$(100)−$x_1$(110)]=[[x(000)+x(100)]−[x(010)+x(110)]]+$(W_8)^2$[[x(001)+x(101)]−[x(011)+x(111)]],

X(011)=$x_3$(011)=$x_2$(011)+$(W_8)^3 x_2$(111)=[$x_1$(001)+j$x_1$(011)]+$(W_8)^3$[$x_1$(101)+j$x_1$(111)]=[[x(000)−x(100)]+j[x(010)−x(110)]]+$(W_8)^3$[[x(001)−x(101)]+j[x(011)−x(111)]],

X(100)=$x_3$(100)=$x_2$(000)−$x_2$(100)=[$x_1$(000)+$x_1$(010)]−[$x_1$(100)+$x_1$(110)]=[[x(000)+x(100)]+[x(010)+x(110)]]−[[x(001)+x(101)]+[x(011)+x(111)]],

X(101)=$x_3$(101)=$x_2$(001)−$(W_8)^1 x_2$(101)=[$x_1$(001)−j$x_1$(011)]−$(W_8)^1$[$x_1$(101)−j$x_1$(111)]=[[x(000)−x(100)]−j[x(010)−x(110)]]−$(W_8)^1$[[x(001)−x(101)]−j[x(011)−x(111)]],

X(110)=$x_3$(110)=$x_2$(010)−$(W_8)^2 x_2$(110)=[$x_1$(000)−$x_1$(010)]−$(W_8)^2$[$x_1$(100)−$x_1$(110)]=[[x(000)+x(100)]−[x(010)+x(110)]]−$(W_8)^2$[[x(001)+x(101)]−[x(011)+x(111)]],

X(111)=$x_3$(111)=$x_2$(011)−$(W_8)^3 x_2$(111)=[$x_1$(001)+j$x_1$(011)]−$(W_8)^3$[$x_1$(101)+j$x_1$(111)]=[[x(000)−x(100)]+j[x(010)−x(110)]]−$(W_8)^3$[[x(001)−x(101)]+j[x(011)−x(111)]], where the arguments of the time-domain samples x(n) and the frequency-domain samples X(p) are presented in binary form, $p_2 p_1 p_0$ and $n_2 n_1 n_0$. As shown in FIG. 4, the time-domain samples x(n) are input to the radix-2 first stage in (binary) digit-reversed order (reversed-binary order), {000, 100,010,110,001,101,011,111}, while the frequency-domain samples X(p) are output from the final radix-2 stage (the third stage, in this example) in natural (binary) digit order, {000,001,010,011,100,101,110,111}.

The 8-point DIT FFT for N=$r_1 r_2$, where $r_1$=2 and $r_2$=4, becomes:

$$x_1(n_0, p_0) = \sum_{n_1=0}^{1} x(n_0, n_1) W_2^{n_1 p_0} \text{ and } X(p_1, p_0) =$$

$$x_2(p_1, p_0) = \sum_{n_0=0}^{3} x_1(n_0, p_0) W_8^{[p_1(2)+p_0]n_0},$$

which is given by a first section (one stage) of 4 radix-2 butterflies followed by a second section of 2 radix-4 butterflies, as shown in FIG. 5. Expanded, the 8-point DIT FFT, for N=$r_1 r_2$, where $r_1$=2 and $r_2$=4, is given by:

X(00)=$x_2$(00)=$x_1$(00)+$x_1$(10)+$x_1$(20)+$x_1$(30) =[x(00)+x(10)]+[x(01)+x(11)]+[x(02)+x(12)]+[x(03)+x(13)],

X(01)=$x_2$(01)=$x_1$(01)+$(W_8)^1 x_1$(11)+$(W_8)^2 x_1$(21)+$(W_8)^3 x_1$(31) =[x(00)−x(10)]+$(W_8)^1$[x(01)−x(11)]+$(W_8)^2$[x(02)−x(12)]+$(W_8)^3$[x(03)−x(13)],

X(10)=$x_2$(10)=$x_1$(00)−j$x_1$(10)−$x_1$(20)+j$x_1$(30) =[x(00)+x(10)]−j[x(01)+x(11)]−[x(02)+x(12)]+j[x(03)+x(13)],

X(11)=$x_2$(11)=$x_1$(01)−j$(W_8)^1 x_1$(11)−$(W_8)^2 x_1$(21)+j$(W_8)^3 x_1$(31) =[x(00)−x(10)]−j$(W_8)^1$[x(01)−x(11)]−$(W_8)^2$[x(02)−x(12)]+j$(W_8)^3$[x(03)−x(13)],

X(20)=$x_2$(20)=$x_1$(00)−$x_1$(10)+$x_1$(20)−$x_1$(30) =[x(00)+x(10)]−[x(01)+x(11)]+[x(02)+x(12)]−[x(03)+x(13)],

X(21)=$x_2$(21)=$x_1$(01)−$(W_8)^1 x_1$(11)+$(W_8)^2 x_1$(21)−$(W_8)^3 x_1$(31) =[x(00)−x(10)]−$(W_8)^1$[x(01 )−x(11)]+$(W_8)^2$[x(02)−x(12)]−$(W_8)^3$[x(03)−x(13)],

X(30)=$x_2$(30)=$x_1$(00)+j$x_1$(10)−$x_1$(20)−j$x_1$(30) =[x(00)+x(10)]+j[x(01)+x(11)]−[x(02)+x(12)]−j[x(03)+x(13)],

X(31)=$x_2$(31)=$x_1$(01)+j$(W_8)^1 x_1$(11)−$(W_8)^2 x_1$(21)−j$(W_8)^3 x_1$(31) =[x(00)−x(10)]+j$(W_8)^1$[x(01)−x(11)]−$(W_8)^2$[x(02)−x(12)]−j$(W_8)^3$[x(03)−x(13)], where the arguments of the time-domain samples x(n) are presented in binary/ternary form, $n_1 n_0$, with n=4$n_1$+$n_0$, for $n_1$=0, 1, and $n_0$=0, 1, 2, 3, and the frequency-domain samples X(p) are presented in ternary/binary form, $p_1 p_0$, with p=2$p_1$+$p_0$, for $p_1$=0, 1, 2, 3, and $p_0$=0, 1. As shown in FIG. 5, the time-domain samples x(n) are input to the radix-2 first section (first stage) in (ternary/binary) digit-reversed order, {00,10,01,11,02,12,03, 13}, while the frequency-domain samples X(p) are output from the radix-4 second section in natural (ternary/binary) digit order, {00,01,10,11,20,21,30,31}. The (ternary/binary) digit-reversed order, {00,10,01,11,02,12,03,13}, may be obtained simply by reversing the order of the digits in the natural (ternary/binary) digit order, {00,01,10,11,20,21,30, 31}.

Similarly, the 8-point DIT FFT for N=$r_1 r_2$, where $r_1$=4 and $r_2$=2, becomes:

$$x_1(n_0, p_0) = \sum_{n_1=0}^{3} x(n_0, n_1) W_4^{n_1 p_0} \text{ and}$$

$$X(p_1, p_0) = x_2(p_1, p_0) = \sum_{n_0=0}^{1} x_1(n_0, p_0) W_8^{[p_1(4)+p_0]n_0},$$

which is given by a first section of 2 radix-4 butterflies followed by a second section of 4 radix-2 butterflies, as shown in FIG. 6. Expanded, the 8-point DIT FFT, for N=$r_1 r_2$, where $r_1$=4 and $r_2$=2, is given by:

X(00)=$x_2$(00)=$x_1$(00)+$x_1$(10) =[x(00)+x(10)+x(20)+x(30)]+[x(01)+x(11)+x(21)+x(31)],

X(01)=$x_2$(01)=$x_1$(01)+$(W_8)^1 x_1$(11) =[x(00)−jx(10)−x(20)+jx(30)]+$(W_8)^1$[x(01)−jx(11)−x(21)+jx(31)],

X(02)=$x_2$(02)=$x_1$(02)+$(W_8)^2 x_1$(12) =[x(00)−x(10)+x(20)−x(30)]+$(W_8)^2$[x(01)−x(11)+x(21)−x(31)],

X(03)=$x_2$(03)=$x_1$(03)+$(W_8)^3 x_1$(13) =[x(00)+jx(10)−x(20)−jx(30)]+$(W_8)^3$[x(01)+jx(11)−x(21)−jx(31)],

X(10)=$x_2$(10)=$x_1$(00)−$x_1$(10) =[x(00)+x(10)+x(20)+x(30)]−[x(01)+x(11)+x(21)+x(31)],

X(11)=$x_2$(11)=$x_1$(01)−$(W_8)^1 x_1$(11) =[x(00)−jx(10)−x(20)+jx(30)]−$(W_8)^1$[x(01)−jx(11)−x(21)+jx(31)],

X(12)=$x_2$(12)=$x_1$(02)−$(W_8)^2 x_1$(12) =[x(00)−x(10)+x(20)−x(30)]−$(W_8)^2$[x(01)−x(11)+x(21)−x(31)],

X(13)=$x_2$(13)=$x_1$(03)−$(W_8)^3 x_1$(13) =[x(00)+jx(10)−x(20)−jx(30)]−$(W_8)^3$[x(01)+jx(11)−x(21)−jx(31)], where the arguments of the time-domain samples x(n) are presented in ternary/binary form, $n_1 n_0$, with n=2$n_1$+$n_0$, for $n_1$=0, 1, 2, 3, and $n_0$=0, 1, and the frequency-domain samples X(p) are presented in binary/ternary form, $p_1 p_0$, with p=4$p_1$+$p_0$, for $p_1$=0, 1, and $p_0$=0, 1, 2, 3. As shown in FIG. 6, the time-domain samples x(n) are input to the radix-4 first section in (binary/ternary) digit-reversed order, {00,10,20, 30,01,11,21,31}, while the frequency-domain samples X(p) are output from the radix-2 second section in natural (binary/ ternary) digit order, {00,01,02,03,10,11,12,13}. The (binary/ ternary) digit-reversed order, {00,10,20,30,01,11,21,31}, may be obtained simply by reversing the order of the digits in the natural (binary/ternary) digit order, {00,01,02,03,10, 11,12,13}.

The foregoing examples suffice to demonstrate that the machine-implemented cascaded DIT FFT (and IFFT) may be readily generalized and extended to larger values for N, the number of sample points, as is well known in the art. Such large-N DIT FFTs and IFFTs are useful in digital signal processing (DSP) applications.

For example, a transform-based audio coding algorithm, such as Dolby® Digital, is designed to provide data-rate reduction for wide-band signals while maintaining the high quality of the original content, as described in L. Fielder et al. "AC-2 and AC-3: Low-Complexity Transform-Based Audio Coding," *Collected Papers on Digital Audio Bit-Rate Reduction, Audio Engineering Society,* New York, N.Y., pp. 54–72. Dolby® Digital is a high-quality audio compression format widely used in feature films and also with Digital Versatile Disks (DVDs), also known as Digital Video Disks. Many PC's offer DVD drives, and providing a Dolby® Digital decoder implemented in software, performing an IFFT as part of the implementation, allows decoding of Dolby® Digital to become a baseline capability on the PC.

Such a transform-based audio coding algorithm may be implemented on a PC based, for example, on an Intel Pentium® processor. It is important to maintain high audio quality, and Dolby® Laboratories has developed a stringent test suite to ensure that a certified decoder indeed provides high quality. In addition, trained listeners evaluate prospective decoders using both test and program material. Only after a decoder has passed both the analytical and subjective tests is the decoder certified.

An Intel Pentium® processor with Intel's MMX™ technology, for example, has MMX™ instructions that operate on 8, 16, and 32 bits. The human ear has an overall dynamic range of 120 dB and an instantaneous dynamic range of 85 dB, as described in S. Harris, "Understanding, enhancing, and measuring PC-audio quality," *EDN,* Vol. 42, Number 8, Apr. 10, 1997, p. 173. The dynamic range of a binary value is 6.0206 dB per bit. Eight bits (about 48 dB of dynamic range, approximately the dynamic range of AM radio) is not sufficient for high-quality audio. Sixteen bits (about 96 dB of dynamic range, the dynamic range of Compact Disks) is usually considered high-quality audio.

Due to quantization noise produced by rounding errors during the intermediate calculations, however, the accuracy at the output of a Dolby® Digital decoder, for example, is significantly less than the accuracy of the intermediate values (assuming a uniform accuracy throughout the transform-based audio coding algorithm). This is typical with DSP algorithms For example, using 16 bits of accuracy uniformly through a Dolby® Digital decoder is not sufficient to pass the Dolby® Laboratories test suite. The quantization noise produced using 16 bits of accuracy uniformly through a Dolby® Digital decoder, for example, can be both noticeable and tonal, making such an implementation unsatisfactory for high-quality audio. Tonal noise tends to be more objectionable than wideband or "white" noise.

The present invention is directed to overcoming, or at least reducing the effects of, one or more of the problems set forth above.

SUMMARY OF INVENTION

In one aspect of the present invention, a method for computing a decimation-in-time Fast Fourier Transform of a sample is provided, the method including inputting first 2B-bit values representing the sample into a radix-4 first section of the decimation-in-time Fast Fourier Transform and performing first complex 2B-bit integer additions and subtractions on the first 2B-bit values to form second 2B-bit values output from the radix-4 first section, without performing a multiplication. The method also includes rounding the second 2B-bit values to form B-bit values output from the radix-4 first section of the decimation-in-time Fast Fourier Transform. In another aspect of the present invention, a digital signal processor using such a method for computing a decimation-in-time Fast Fourier Transform of a sample is provided.

BRIEF DESCRIPTION OF THE DRAWINGS

Other objects and advantages of the invention will become apparent upon reading the following detailed description and upon reference to the drawings in which.

Figure 1:
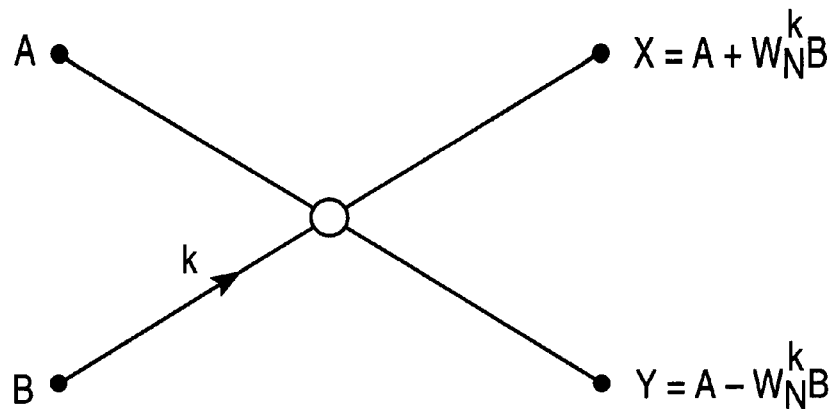
FIG. 1 shows a conventional radix-2 butterfly for a decimation-in-time (DIT) Fast Fourier Transform (FFT)

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 7:
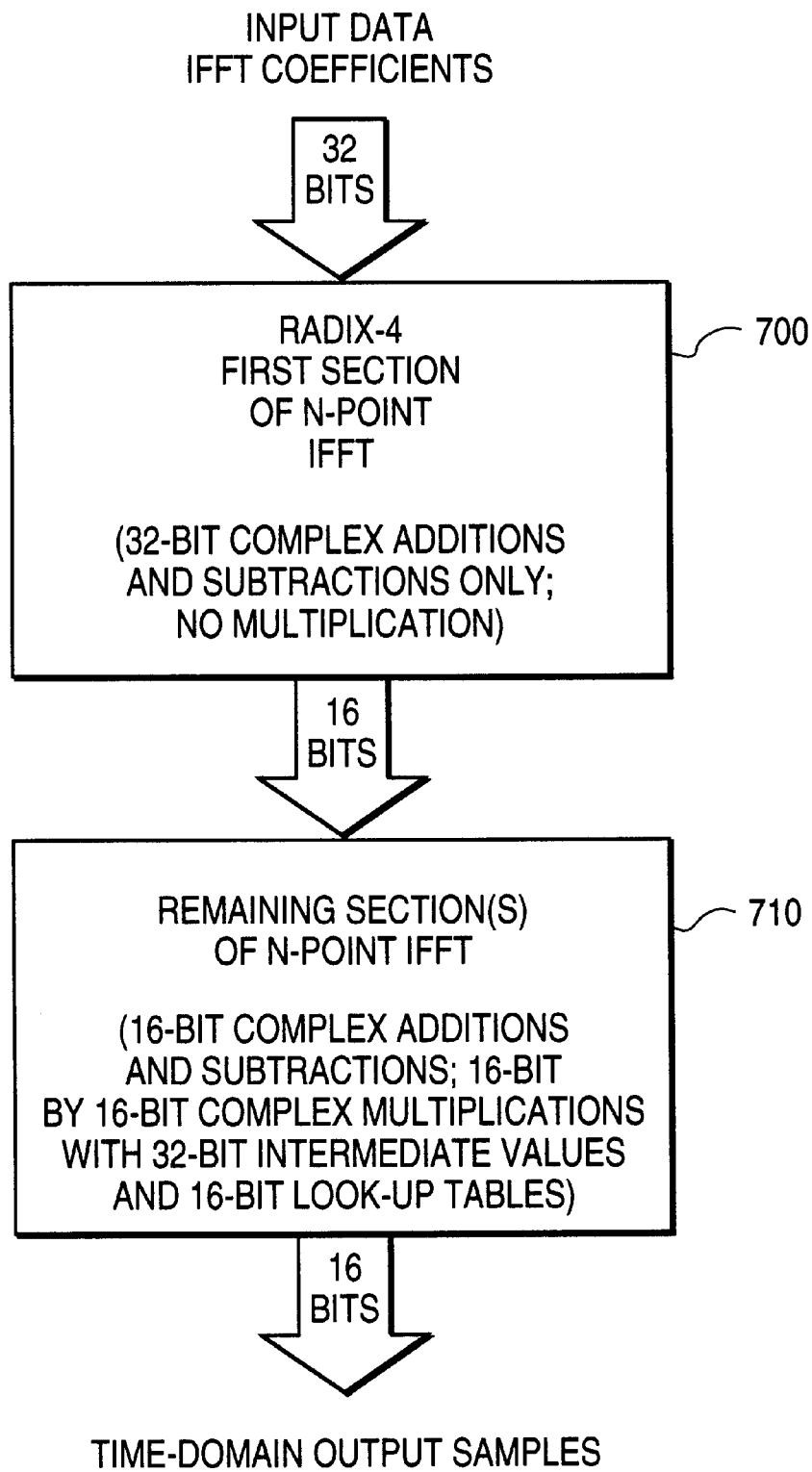
FIG. 7 shows an exemplary embodiment of the present invention.

Turning now to the drawings, and in particular to FIG. 7, an exemplary embodiment of the present invention is shown. A 32-bit radix-4 section 700 is used as the first section of an N-point Inverse Fast Fourier Transform (IFFT). As shown in FIG. 7, the input data are quantized to 32 bits. Preferably, the accuracy of the input data is at least 18 bits to prevent overflow during addition and subtraction operations. For example, for DSP applications the precision should be at least 18 bits. All of the IFFT twiddle factors $(W_N)^k$ for a radix-4 first section of an N-point IFFT are either ±1 or ±j. For example, a radix-4 first section of a DIT FFT is:

$$x_1(n_0, n_1, n_2, \ldots, n_{m-2}, p_0) = \sum_{n_{m-1}=0}^{3} x(n_0, n_1, n_2, \ldots, n_{m-2}, n_{m-1}) \left( \exp\left(\frac{-(2\pi)j}{4}\right) \right)^{p_0 n_{m-1}},$$

in general, for $$N = 4 r_2 \cdots r_m, \text{ and}$$

$$W_4^s = \exp\left(\frac{-(2\pi)js}{4}\right) = \cos\left(\frac{2\pi s}{4}\right) - j\sin\left(\frac{2\pi s}{4}\right) = \pm 1, \pm j,$$

for even, or odd, integer s, respectively. The computations in a radix-4 first section of an N-point DIT FFT only involve complex additions and subtractions, $A \pm B = (A_{real} + jA_{imaginary}) \pm (B_{real} + jB_{imaginary}) = (A_{real} \pm B_{real}) + j(A_{imaginary} \pm B_{imaginary})$, and do not entail any real multiplications, or complex multiplications: $AB = (A_{real} + jA_{imaginary})(B_{real} + jB_{imaginary}) = (A_{real}B_{real} - A_{imaginary}B_{imaginary}) + j(A_{imaginary}B_{real} + A_{real}B_{imaginary})$ where $A_{real}$ is the real part of A and $A_{imaginary}$ is the imaginary part of A, and $B_{real}$ is the real part of B and $B_{imaginary}$ is the imaginary part of B.

The N-point IFFT for each time-domain component x(n) may be computed by complex conjugating the N-point DIT FFT of the sequence $\{X^*(p)\}$ (for p=0, 1, 2, . . . , N−1), and dividing by the number of points N, so the radix-4 first section 700 of the N-point IFFT also has twiddle factors $(W_4)^{2t} = \pm 1$, and $(W_4)^{2t+1} = \pm j$, for t=0, 1, 2, . . . , as in the case of the radix-4 first section of the N-point DIT FFT. Similarly, the computations in the radix-4 first section 700 of the N-point IFFT also only involve complex additions and subtractions, and also do not entail any multiplications, as in the case of the radix-4 first section of the N-point DIT FFT.

Figure 2:
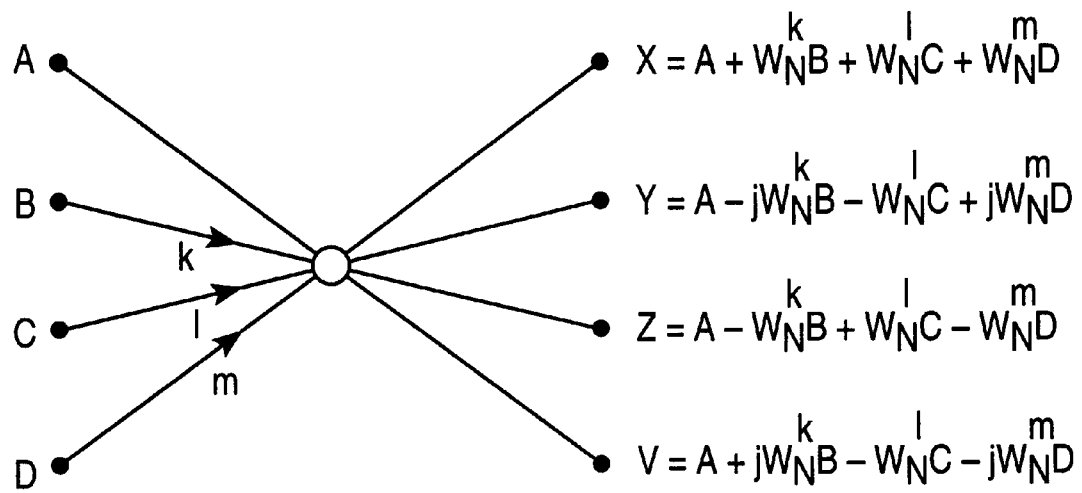
FIG. 2 shows conventional radix-4 butterfly for a DIT FFT.
Figure 6:
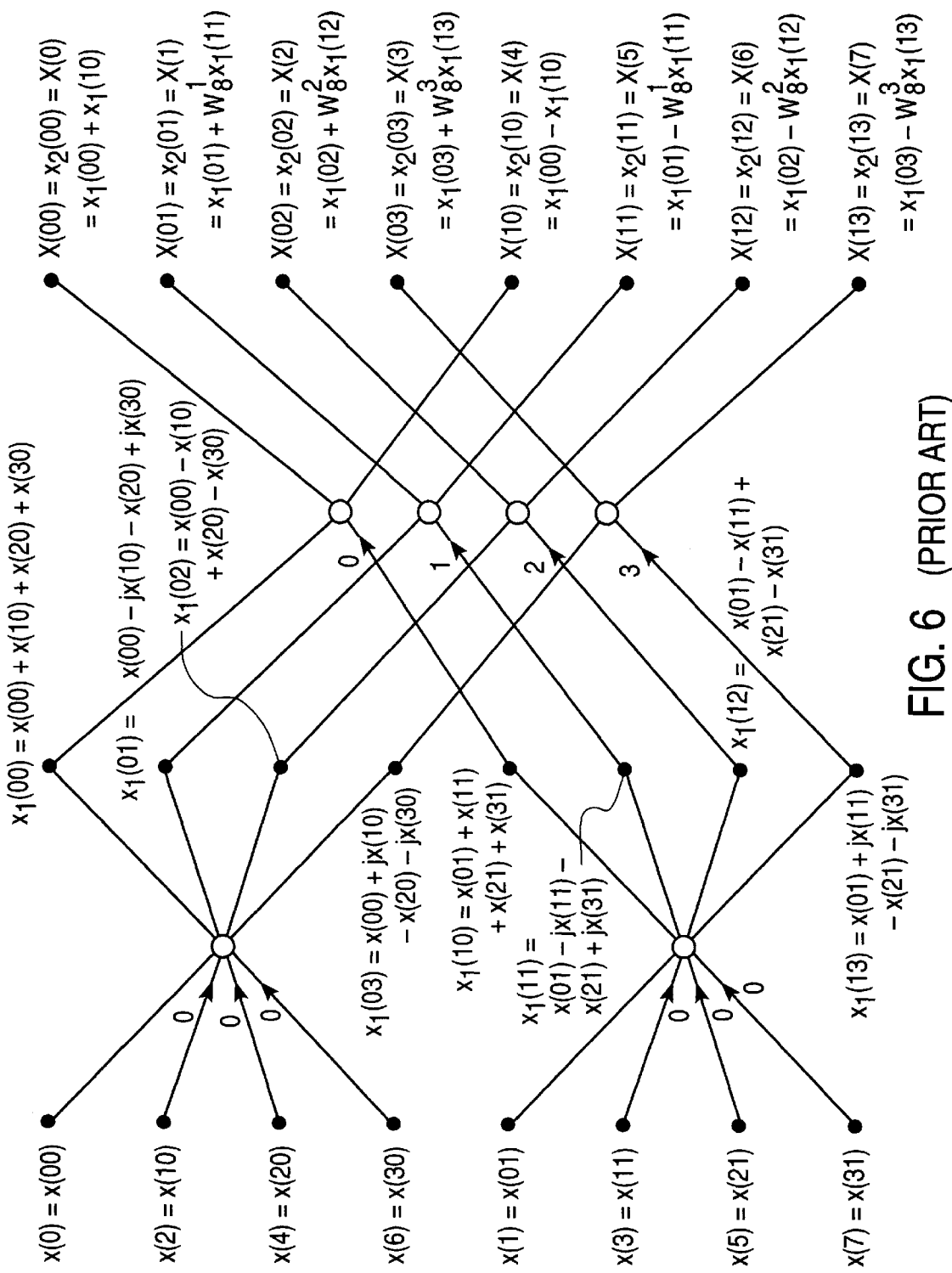
FIG. 6 shows a conventional 8-point mixed-radix DIT FFT having two sections, the first with 2 radix-4 butterflies, and the second with 4 radix-2 butterflies.

For example, the radix-4 butterfly for DIT FFTs with k=l=m=0 only involves complex additions and subtractions, as shown in FIG. 2, and does not involve any multiplication. Similarly, the radix-4 first section of the 8-point mixed-radix DIT FFT, as shown in FIG. 6, with 2 radix-4 butterflies and k=l=m=0 for each, only involves complex additions and subtractions, and does not involve any multiplication.

As shown in FIG. 7, data output from the radix-4 first section 700 of the N-point IFFT are quantized, preferably by rounding, to 16 bits. Rounding a number of 2B-bits to a number of B-bits involves choosing the B-bit number that is closest in value to the 2B-bit number. For example, consider numbers presented in a two's complement binary number representation. The first bit in a two's complement binary number representation indicates the sign of the number, "0" indicating a non-negative number, and "1" indicating a negative number. The negative of a number in the two's complement binary number representation is obtained by complementing all of the bits of the number in the two's complement binary number representation (changing every "0" to a "1" and every "1" to a "0") and then adding one unit to the least significant bit. For example, negating 00.010101 gives −(00.010101)=(11.101010+00.000001)=11.01011, and, consistently, negating 11.101011 gives −(11.101011)= (00.010100+00.000001)=00.010101.

Rounding the 8-bit number 00.010101 (21/64 in base-10) to 4 bits yields the 4-bit number 00.01 (16/64 in base-10). Similarly, rounding the 16-bit number 00.01010010101001 (5289/16384 in base-10) to 8 bits yields the 8-bit number 00.010101 (5376/16384 in base-10), whereas truncating the 16-bit number 00.01010010101001 (5289/16384 in base-10) to 8 bits, by throwing away the least significant 8 bits, yields the 8-bit number 00.010100 (5120/16384 in base-10), showing that rounding generally yields a more accurate result. When the result of rounding would be ambiguous, for example, rounding the 16-bit number 00.01010010000000 (5248/16384 in base-10) to 8 bits yields either the 8-bit number 00.010100 (5120/16384 in base-10) or the 8-bit number 00.010101 (5376/16384 in base-10), then either convergent or non-convergent rounding may be used. For example, convergent rounding would make a random choice between the two possible rounded 8-bit numbers, whereas non-convergent rounding would choose the 8-bit number 00.010101 (5376/16384 in base-10), non-convergent rounding being equivalent to adding 1 to the least significant 1 bit of the number to be rounded.

The rounded 16-bit data output from the radix-4 first section 700 of the N-point IFFT are input to the remaining section(s) 710 of the N-point IFFT, as shown in FIG. 7. The operations performed on the rounded 16-bit data output from the radix-4 first section 700 of the N-point IFFT may include 16-bit complex additions and subtractions, as well as 16-bit by 16-bit complex multiplications and the use of 16-bit lookup tables for the twiddle factors $(W_N)^k$ for the remaining section(s) 710 of the N-point IFFT. As shown in FIG. 7, the 16-bit time-domain output samples are output from the remaining section(s) 710 of the N-point IFFT, available for further DSP applications.

Single Instruction Multiple Data (SIMD) architectures, having multiple processing units simultaneously operating on multiple sets of operands within a single instruction cycle, may be used to provide a processor-efficient implementation of an N-point IFFT, according to embodiments of the present invention. Intel's MMX™ technology is an example of an implementation of a SIMD architecture that may be used to provide a processor-efficient implementation of an N-point IFFT, according to embodiments of the present invention. Such an implementation of an N-point IFFT for a PC based on a Pentium® processor with MMX™ technology, for example, provides both good execution speed and high-quality precision. Rather than using 32-bit floating-point numbers throughout the data path and only using MMX™ technology for bit manipulation, an implementation that would not be processor-efficient, MMX™ technology provides integer operations that are more processor-efficient than existing floating-point operations and the MMX™ instructions are preferably used as much as possible.

For example, MMX™ technology may provide 32-bit complex integer adds and subtracts and may have implementations having two arithmetic/logic units (ALUs). The radix-4 first section of the N-point IFFT, involving only complex additions and subtractions, and not involving any multiplications, may benefit greatly from the 32-bit operations provided by MMX™ technology. Spectral peaks tend to be created in the first sections of an N-point IFFT. By enabling the radix-4 first section of the N-point IFFT to be performed in 32 bits, without incurring any quantization errors from rounding or truncation, the spectral peaks are significantly reduced in this embodiment of the present invention as compared to conventional machine-implementations of the N-point IFFT that are performed in 16 bits throughout, in all sections of the N-point IFFT.

Complex multiplication in the MMX™ instruction set is 16-bit by 16-bit, yielding a 32 bit intermediate accumulation result. The remaining sections of the N-point IFFT, performed in pass-to-pass representations of 16 bits, would also benefit from using MMX™ technology.

Figure 8:
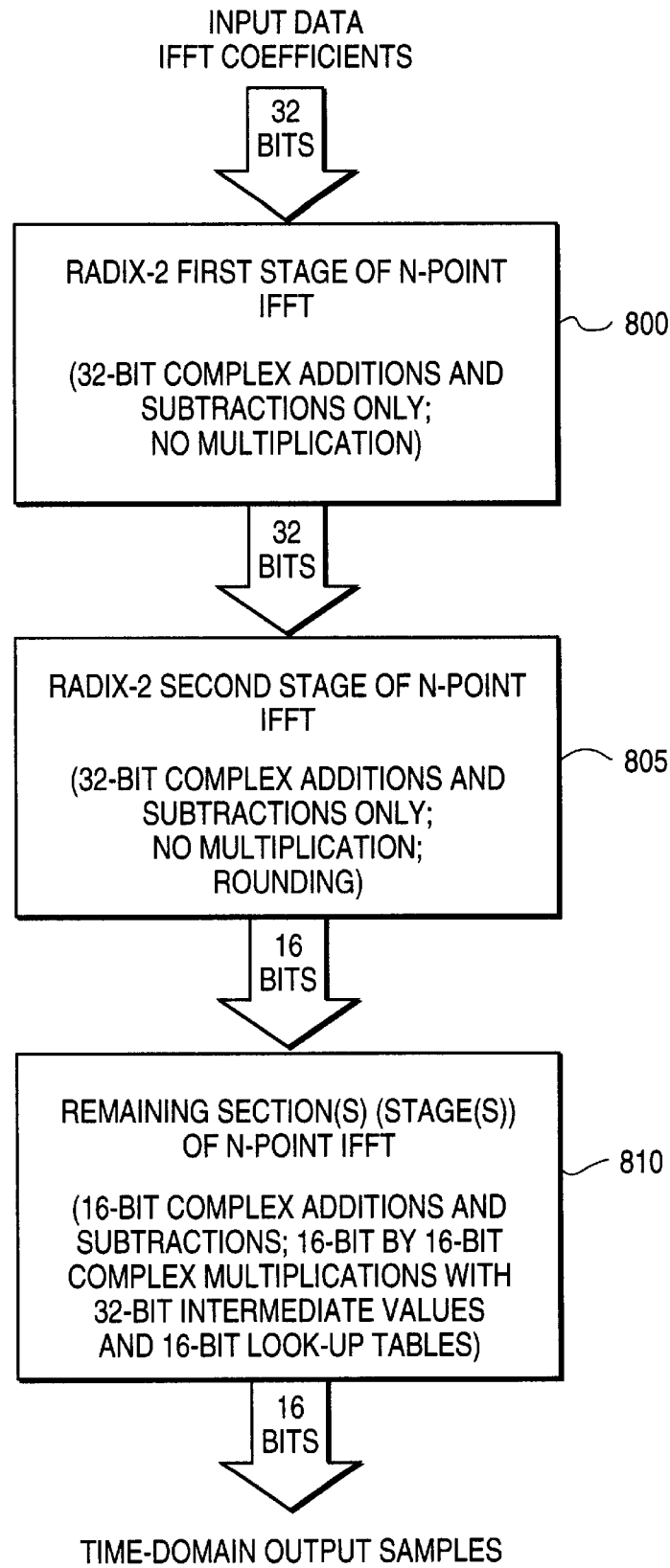
FIG. 8 shows another exemplary embodiment of the present invention.

Turning now to FIG. 8, another exemplary embodiment of the present invention is shown. Two 32-bit radix-2 sections 800 and 805 are used as the first and second sections (or stages) of an N-point IFFT. As shown in FIG. 8, the input data are quantized to 32 bits. Preferably, the accuracy of the input data is at least 18 bits to prevent overflow during addition and subtraction operations. For example, for DSP applications the precision should be at least 18 bits. All of the IFFT twiddle factors $(W_N)^k$ for radix-2 first and second sections (or stages) of an N-point IFFT are either ±1 or ±j. For example, a radix-2 first section (or stage) of a DIT FFT is:

$$x_1(n_0, n_1, n_2, \ldots, n_{m-2}, p_0) = \sum_{n_{m-1}=0}^{1} x(n_0, n_1, n_2, \ldots, n_{m-2}, n_{m-1}) \left(\exp\left(\frac{-(2\pi)j}{2}\right)\right)^{p_0 n_{m-1}},$$

in general for $N = 2r_2 \cdots r_m,$ and $$W_2^s = \exp\left(\frac{-(2\pi)js}{2}\right) = \cos\left(\frac{2\pi s}{2}\right) - j\sin\left(\frac{2\pi s}{2}\right) = \pm 1,$$

for any integer s. Similarly, a radix-2 second section of a DIT FFT having a radix-2 first section (or stage) is:

$$x_2(n_0, n_1, n_2, \ldots, n_{m-3}, p_1, p_0) = \sum_{n_{m-2}=0}^{1} x_1(n_0, n_1, n_2, \ldots, n_{m-2}, p_0) \left(\exp\left(\frac{-(2\pi)j}{4}\right)\right)^{p_0 n_{m-1}},$$

in general, for $N = 4r_3 \cdots r_m,$ and $$W_4^s = \exp\left(\frac{-(2\pi)js}{4}\right) = \cos\left(\frac{2\pi s}{4}\right) - j\sin\left(\frac{2\pi s}{4}\right) = \pm 1, \pm j,$$

for even, or odd, integer s, respectively. The computations in the radix-2 first and second sections (or stages) of an N-point DIT FFT only involve complex additions and subtractions, and do not entail any multiplications.

The N-point IFFT for each time-domain component x(n) may be computed by complex conjugating the N-point DIT FFT of the sequence {X*(p)}(for p=0, 1, 2, ..., N−1), and dividing by the number of points N, so the radix-2 first and second sections (or stages) 800 and 805 of the N-point IFFT also have twiddle factors $(W_2)^1 = \pm 1$, $(W_4)^{2t} = \pm 1$, and $(W_4)^{2t+1} = \pm j$, for t=0, 1, 2, ..., as in the case of the radix-2 first and second sections (or stages) of the N-point DIT FFT. Similarly, the computations in radix-2 first and second sections (or stages) 800 and 805 of the N-point IFFT also only involve complex additions and subtractions, and also do not entail any multiplications, as in the case of the radix-2 first and second sections (or stages) of the N-point DIT FFT.

Figure 3:
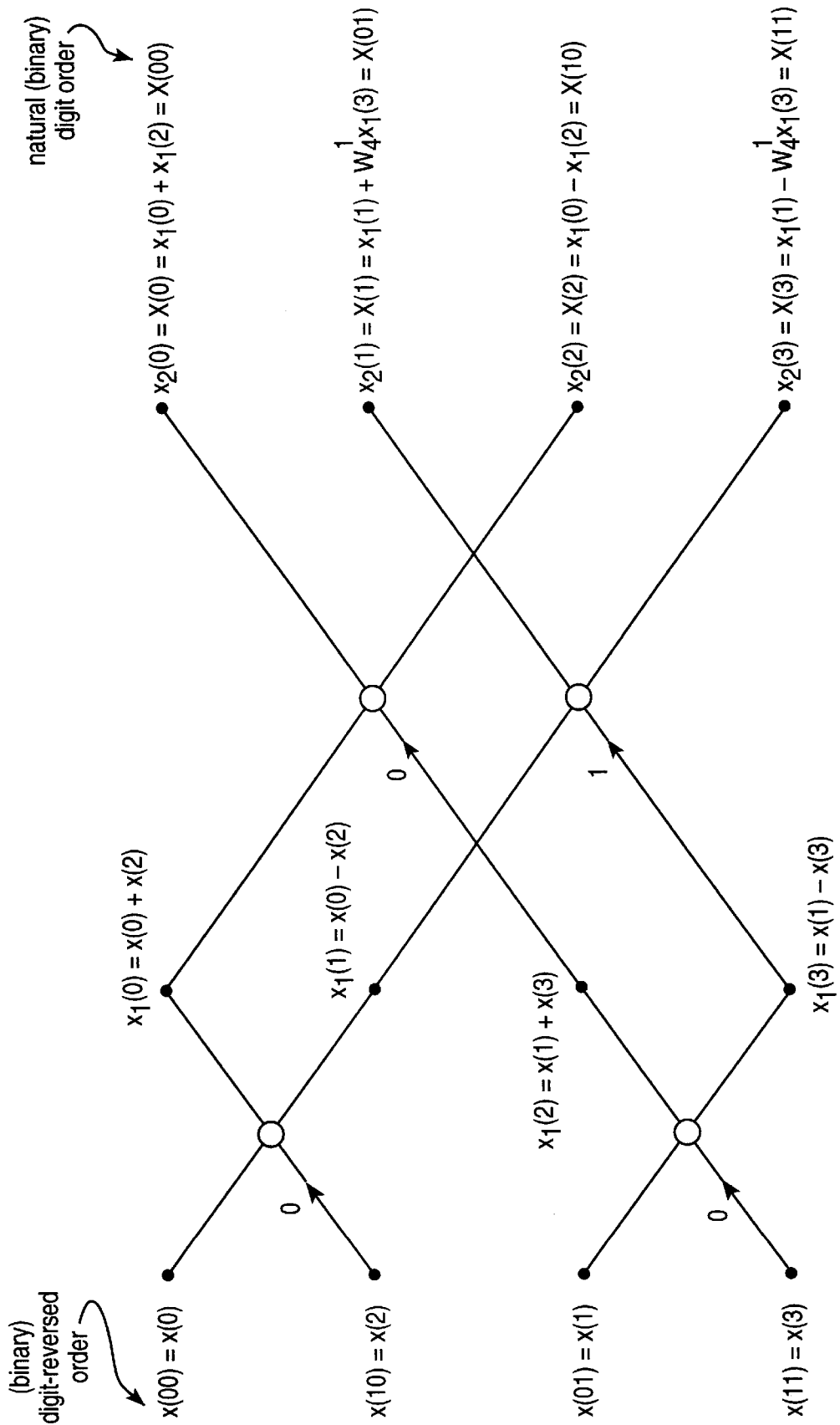
FIG. 3 shows a conventional 4-point DIT FFT having two stages, each with 2 radix-2 butterflies.
Figure 4:
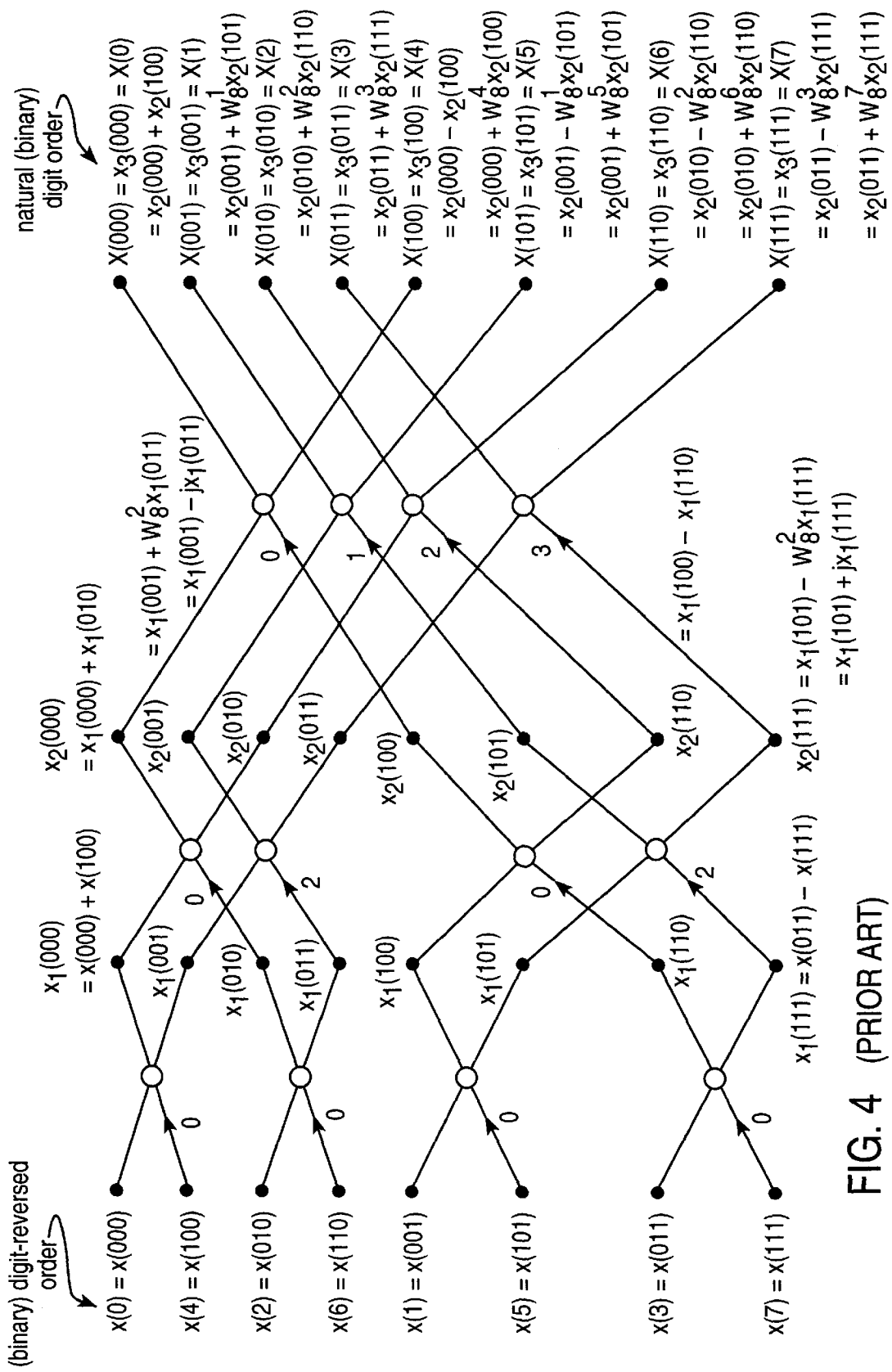
FIG. 4 shows a conventional 8-point DIT FFT having three stages, each with 4 radix-2 butterflies.
Figure 5:
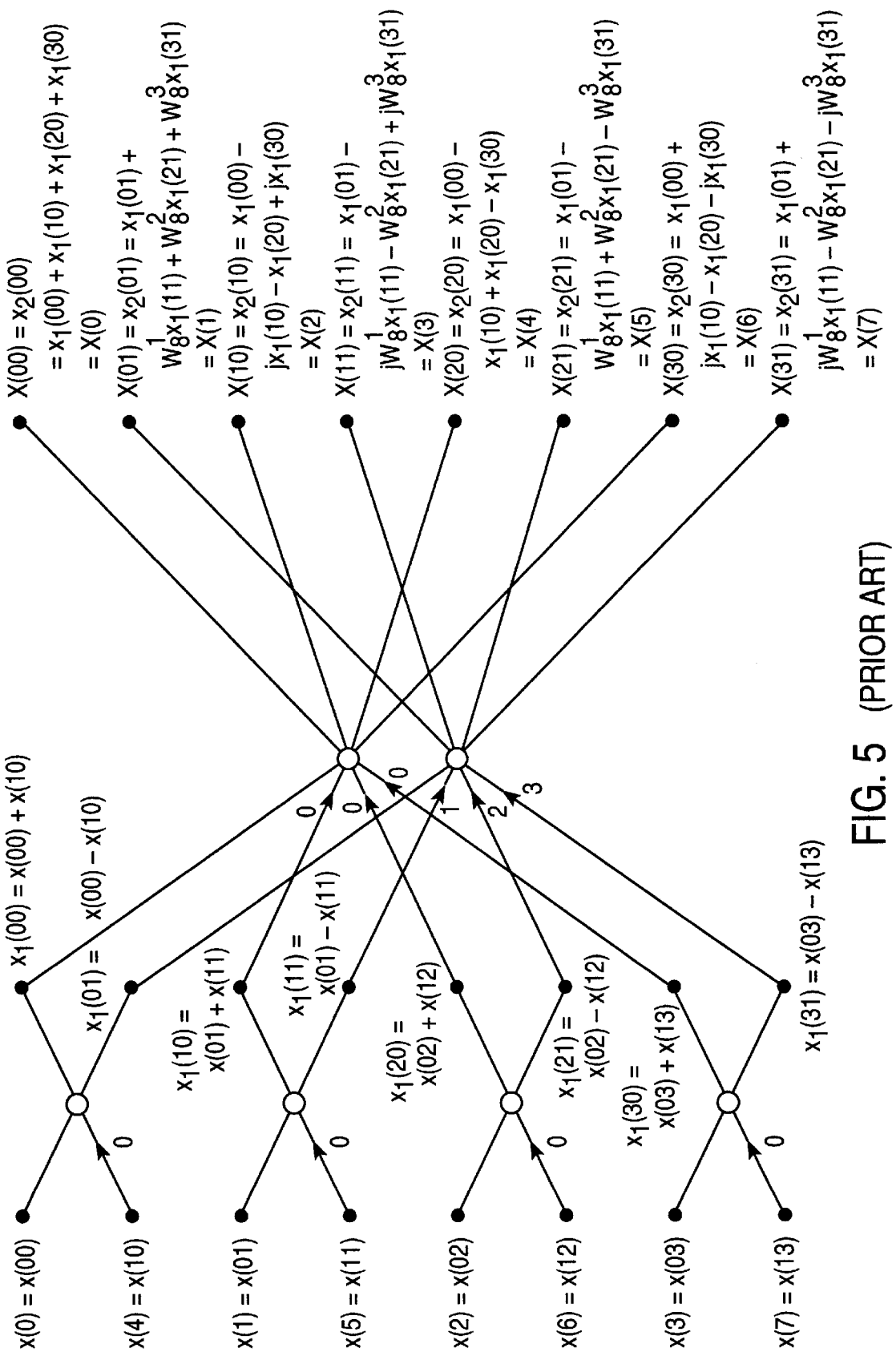
FIG. 5 shows a conventional 8-point mixed-radix DIT FFT having two sections, the first with 4 radix-2 butterflies, and the second with 2 radix-4 butterflies.

For example, the two stages of 2 radix-2 butterflies each for the 4-point DIT FFT shown in FIG. 3 only involve complex additions and subtractions, as shown in FIG. 3, and do not involve any multiplication. Similarly, the two stages of 4 radix-2 butterflies each for the 8-point DIT FFT shown in FIG. 4 only involve complex additions and subtractions, as shown in FIG. 4, and do not involve any multiplication.

As shown in FIG. 8, data output from the radix-2 second section (or stage) 805 of the N-point IFFT are quantized, preferably by rounding, to 16 bits. The rounded 16-bit data output from the radix-2 second section (or stage) 805 of the N-point IFFT are input to the remaining section(s) 810 of the N-point IFFT, as shown in FIG. 8. The operations performed on the rounded 16-bit data output from the radix-2 second section (or stage) of the N-point IFFT may include 16-bit complex additions and subtractions, as well as 16-bit by 16-bit complex multiplications, with accumulations of 32-bit intermediate values, and the use of 16-bit lookup tables for the twiddle factors $(W_N)^k$ for the remaining section(s) 810 of the N-point IFFT. As shown in FIG. 8, the 16-bit time-domain output samples are output from the remaining section(s) 810 of the N-point IFFT, available for further DSP applications.

Figure 9:
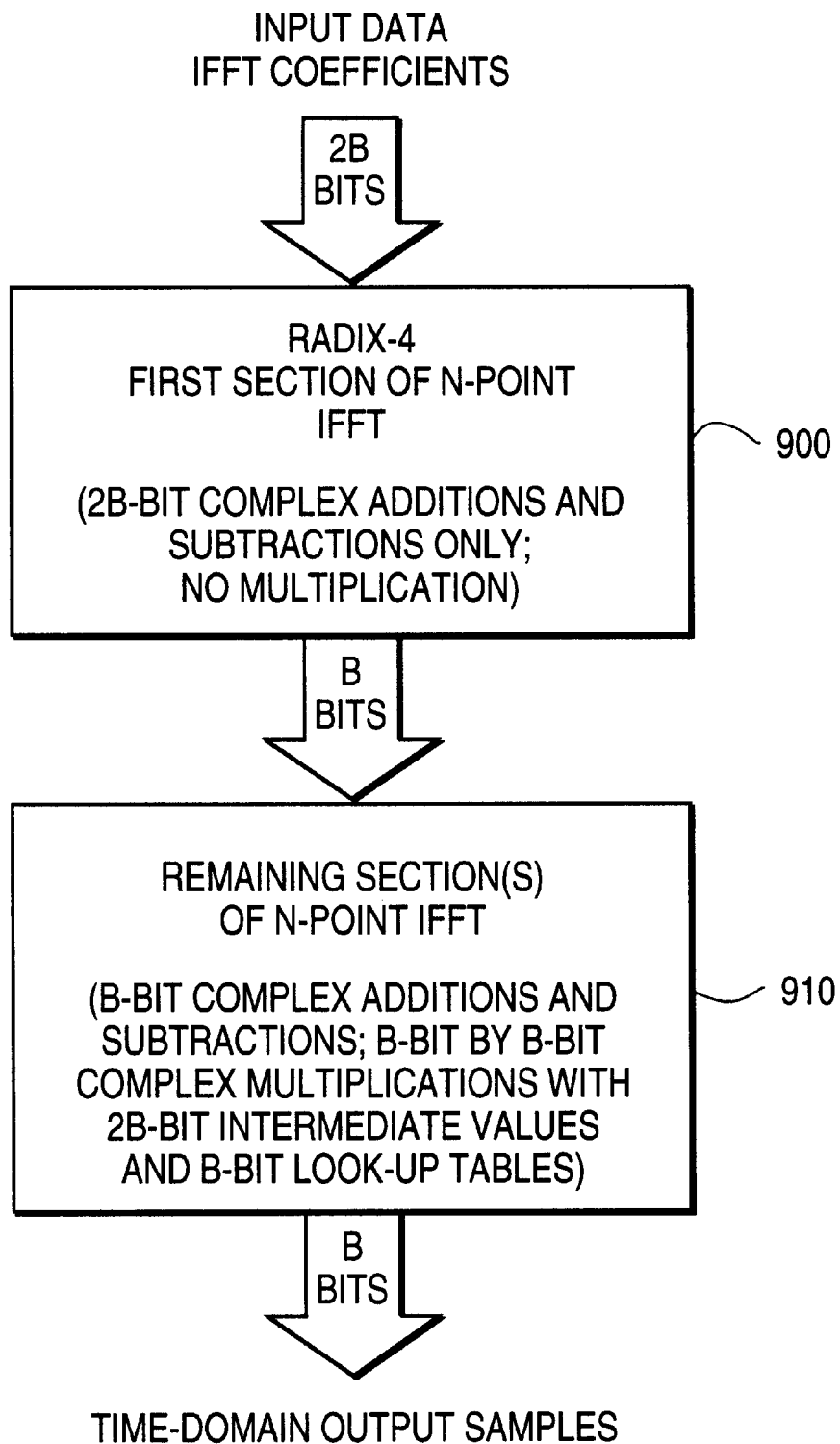
FIG. 9 shows yet another exemplary embodiment of the present invention.

Turning now to FIG. 9, yet another exemplary embodiment of the present invention is shown. A 2B-bit radix-4 section 900 is used as the first section of an N-point IFFT. As shown in FIG. 9, the input data are quantized to 2B bits. Preferably, the accuracy of the input data is at least 18 bits to prevent overflow during addition and subtraction operations. For example, for DSP applications the precision should be at least 18 bits. As explained above, all of the IFFT twiddle factors $(W_N)^k$ for the radix-4 first section 900 of an N-point IFFT are either ±1 or ±j. As in the exemplary embodiment shown in FIG. 7, the computations in the radix-4 first section 900 of an N-point IFFT only involve complex additions and subtractions, and do not entail any multiplications, as in the case of a radix-4 first section of an N-point DIT FFT.

As shown in FIG. 9, data output from the radix-4 first section 900 of the N-point IFFT are quantized, preferably by rounding, to B bits. The rounded B-bit data output from the radix-4 first section 900 of the N-point IFFT are input to the remaining section(s) 910 of the N-point IFFT, as shown in FIG. 9. The operations performed on the rounded B-bit data output from the radix-4 first section 900 of the N-point IFFT may include B-bit complex additions and subtractions, as well as B-bit by B-bit complex multiplications, with accumulations of 2B-bit intermediate values, and the use of B-bit lookup tables for the twiddle factors $(W_N)^k$ for the remaining section(s) 910 of the N-point IFFT. As shown in FIG. 9, the B-bit time-domain output samples are output from the remaining section(s) 910 of the N-point IFFT, available for further DSP applications.

Figure 10:
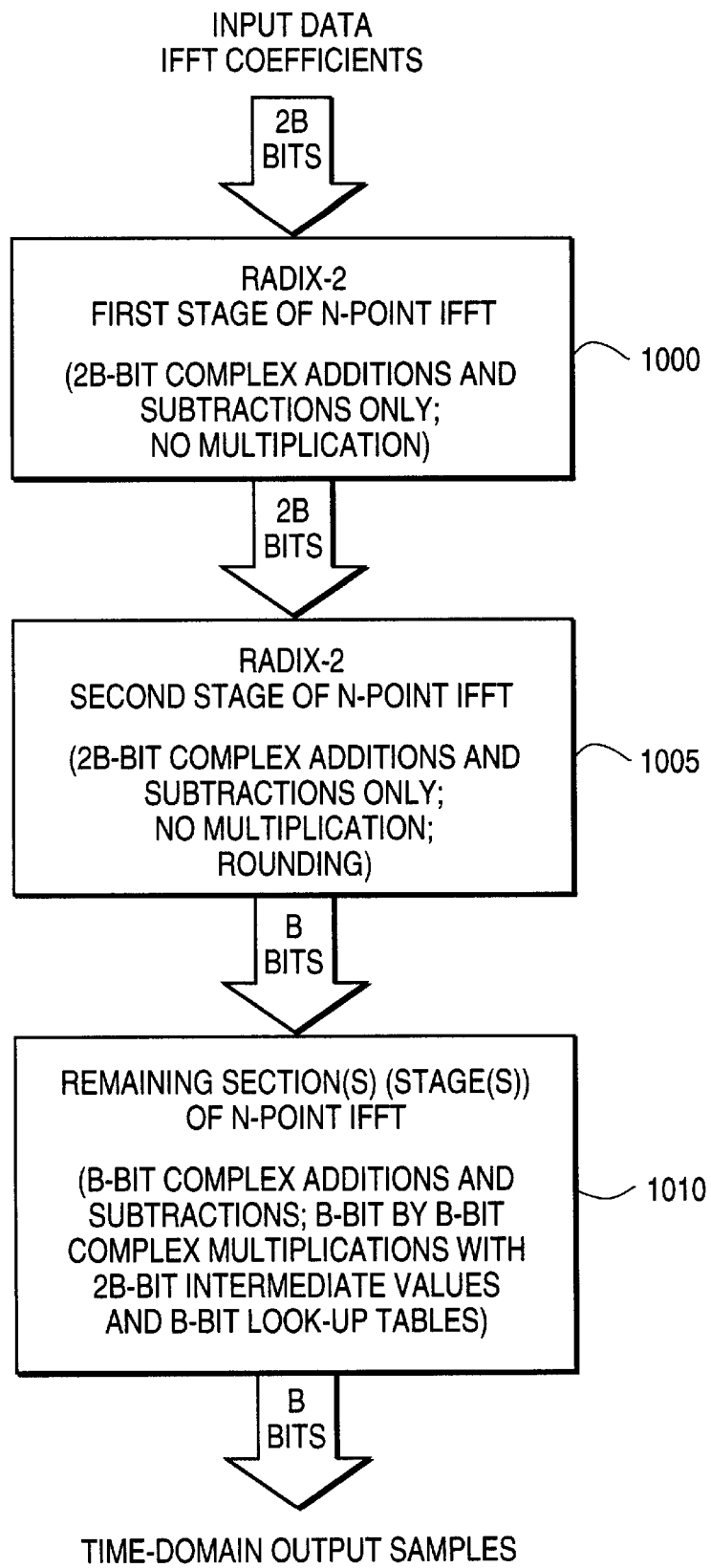
FIG. 10 shows still yet another exemplary embodiment of the present invention.

Turning now to FIG. 10, still yet another exemplary embodiment of the present invention is shown. Two 2B-bit radix-2 sections (or stages) 1000 and 1005 are used as the first and second sections (or stages) of an N-point Inverse Fast Fourier Transform (IFFT). As shown in FIG. 10, the input data are quantized to 2B bits. Preferably, the accuracy of the input data is at least 18 bits to prevent overflow during addition and subtraction operations. For example, for DSP applications the precision should be at least 18 bits. As explained above, all of the IFFT twiddle factors $(W_N)^k$ for radix-2 first and second sections (or stages) 1000 and 1005 of the N-point IFFT are either ±1 or ±j. As in the exemplary embodiment shown in FIG. 8, the computations in the radix-2 first and second sections (or stages) 1000 and 1005 of the N-point IFFT only involve complex additions and subtractions, and do not entail any multiplications, as in the case of a radix-2 first and second sections (or stages) of an N-point DIT FFT.

As shown in FIG. 10, data output from the radix-2 second section (or stage) 1005 of the N-point IFFT are quantized, preferably by rounding, to B bits. The rounded B-bit data output from the radix-2 second section (or stage) 1005 of the N-point IFFT are input to the remaining section(s) 1010 of the N-point IFFT, as shown in FIG. 10. The operations performed on the rounded B-bit data output from the radix-2 second section (or stage) 1005 of the N-point IFFT may include B-bit complex additions and subtractions, as well as B-bit by B-bit complex multiplications, with accumulations of 2B-bit intermediate values, and the use of B-bit lookup tables for the twiddle factors $(W_N)^k$ for the remaining section(s) 1010 of the N-point IFFT. As shown in FIG. 10, the B-bit time-domain output samples are output from the remaining section(s) 1010 of the N-point IFFT, available for further DSP applications.

Figure 11:
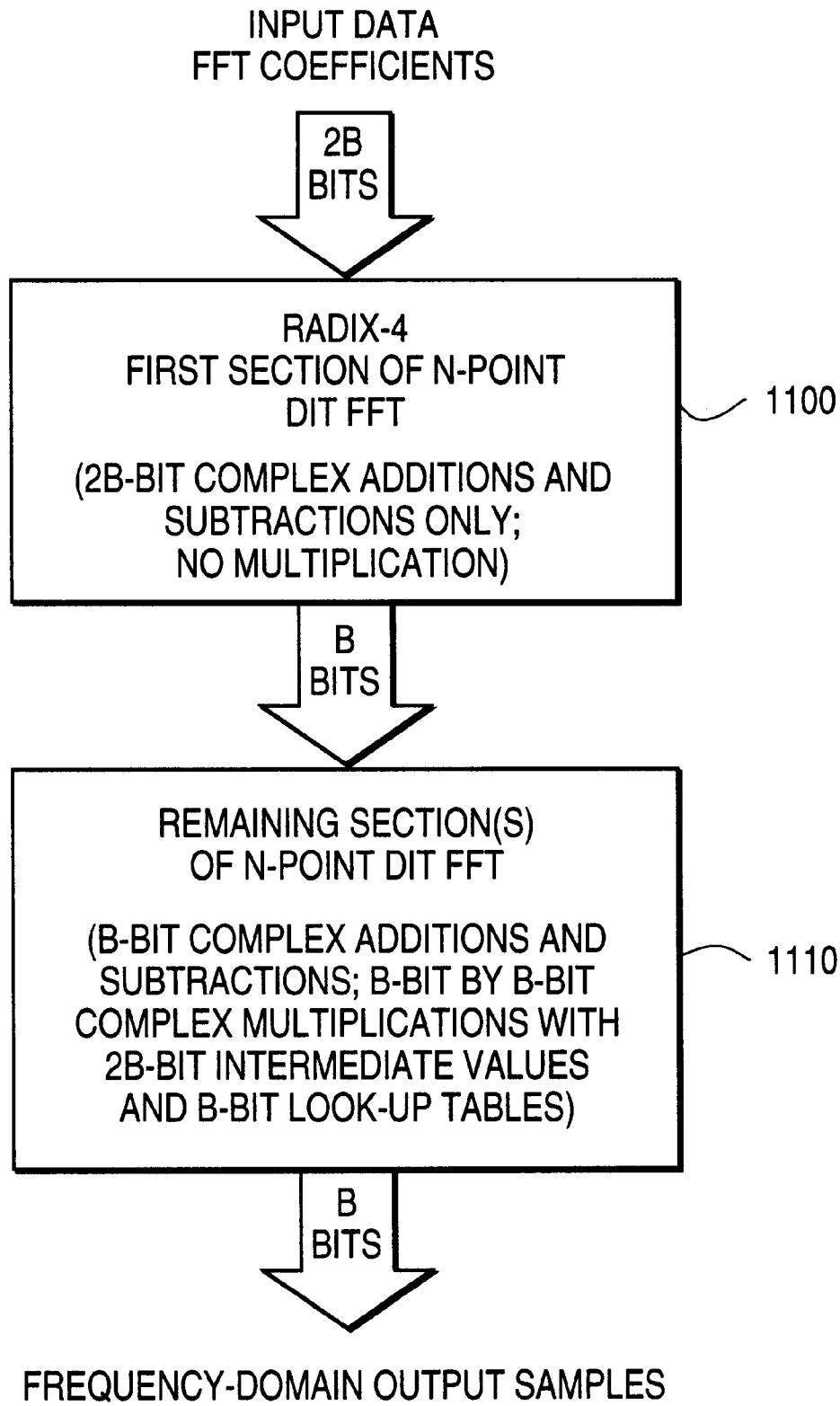
FIG. 11 shows still another exemplary embodiment of the present invention.

Turning now to FIG. 11, still another exemplary embodiment of the present invention is shown. A 2B-bit radix-4 section 1100 is used as the first section of an N-point DIT FFT. As shown in FIG. 11, the input data are quantized to 2B bits. As explained above, all of the FFT twiddle factors $(W_N)^k$ for the radix-4 first section 1100 of the N-point DIT FFT are either ±1 or ±j. The computations in the radix-4 first section 1100 of the N-point DIT FFT only involve complex additions and subtractions, and do not entail any multiplications, as in the case of the radix-4 first section 700 and 900 of the N-point IFFT, as shown in FIGS. 7 and 9, respectively.

As shown in FIG. 11, data output from the radix-4 first section 1100 of the N-point DIT FFT are quantized, preferably by rounding, to B bits. The rounded B-bit data output from the radix-4 first section 1100 of the N-point DIT FFT are input to the remaining section(s) 1110 of the N-point DIT FFT, as shown in FIG. 11. The operations performed on the rounded B-bit data output from the radix-4 first section 1100 of the N-point DIT FFT may include B-bit complex additions and subtractions, as well as B-bit by B-bit complex multiplications, with accumulations of 2B-bit intermediate values, and the use of B-bit lookup tables for the twiddle factors $(W_N)^k$ for the remaining section(s) 1110 of the N-point DIT FFT. As shown in FIG. 11, the B-bit frequency-domain output samples are output from the remaining section(s) 1110 of the N-point DIT FFT, available for further applications.

Figure 12:
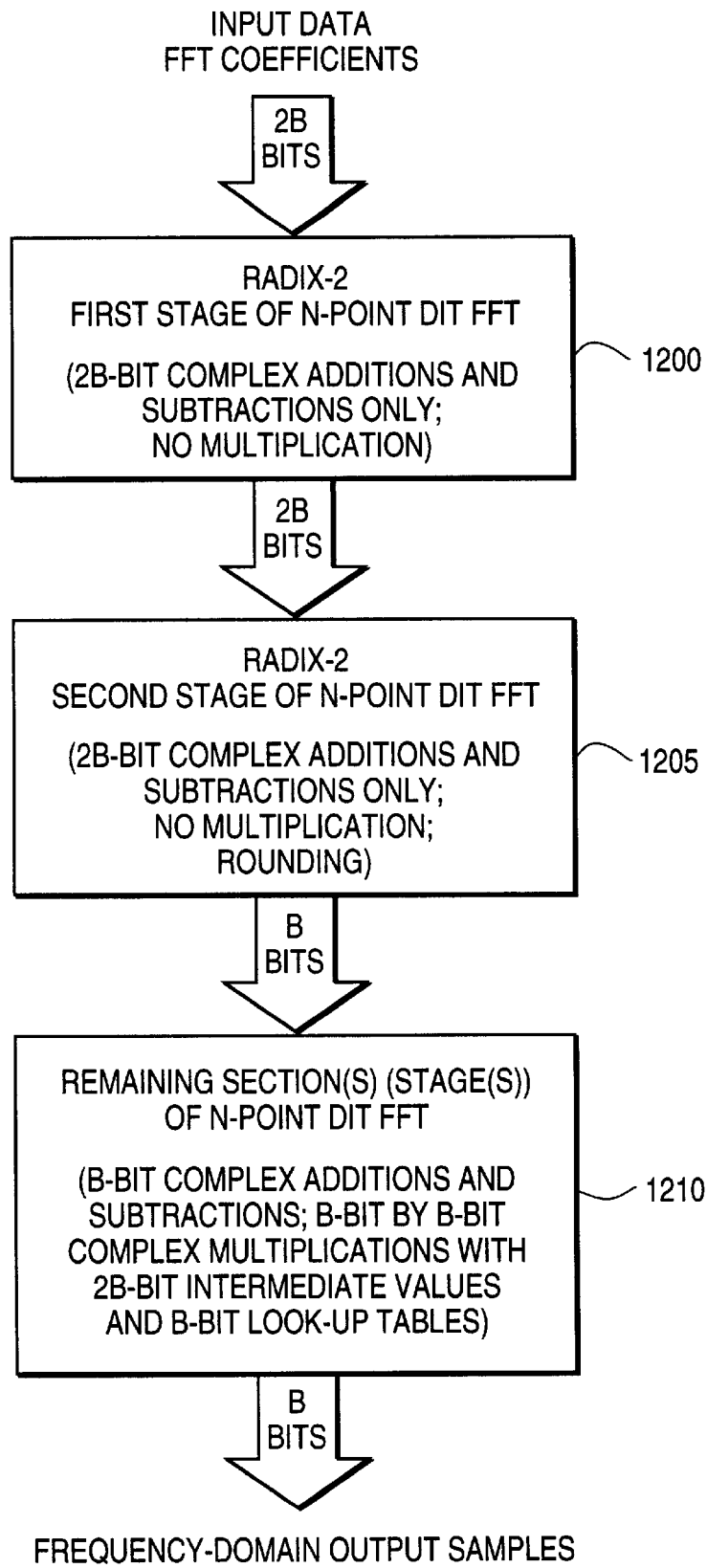
FIG. 12 shows yet still another exemplary embodiment of the present invention.

Turning now to FIG. 12, yet still another exemplary embodiment of the present invention is shown. Two 2B-bit radix-2 sections (or stages) 1200 and 1205 are used as the first and second sections (or stages) of an N-point DIT FFT. As shown in FIG. 12, the input data are quantized to 2B bits. As explained above, all of the FFT twiddle factors $(W_N)^k$ for radix-2 first and second sections (or stages) 1200 and 1205 of an N-point DIT FFT are either ±1 or ±j. The computations in the radix-2 first and second sections (or stages) 1200 and 1205 of the N-point IFFT only involve complex additions and subtractions, and do not entail any multiplications, as in the case of the radix-2 first and second sections (or stages) 800 and 805, 1000 and 1005 of the N-point IFFT, as shown in FIGS. 8 and 10, respectively.

As shown in FIG. 12, data output from the radix-2 second section (or stage) 1205 of the N-point IFFT are quantized, preferably by rounding, to B bits. The rounded B-bit data output from the radix-2 second section (or stage) 1205 of the N-point IFFT are input to the remaining section(s) 1210 of the N-point IFFT, as shown in FIG. 12. The operations performed on the rounded B-bit data output from the radix-2 second section (or stage) 1205 of the N-point IFFT may include B-bit complex additions and subtractions, as well as B-bit by B-bit complex multiplications, with accumulations of 2B-bit intermediate values, and the use of B-bit lookup tables for the twiddle factors $(W_N)^k$ for the remaining section(s) 1210 of the N-point DIT FFT. As shown in FIG. 12, the B-bit frequency-domain output samples are output from the remaining section(s) 1210 of the N-point DIT FFT, available for further applications.

Figure 13:
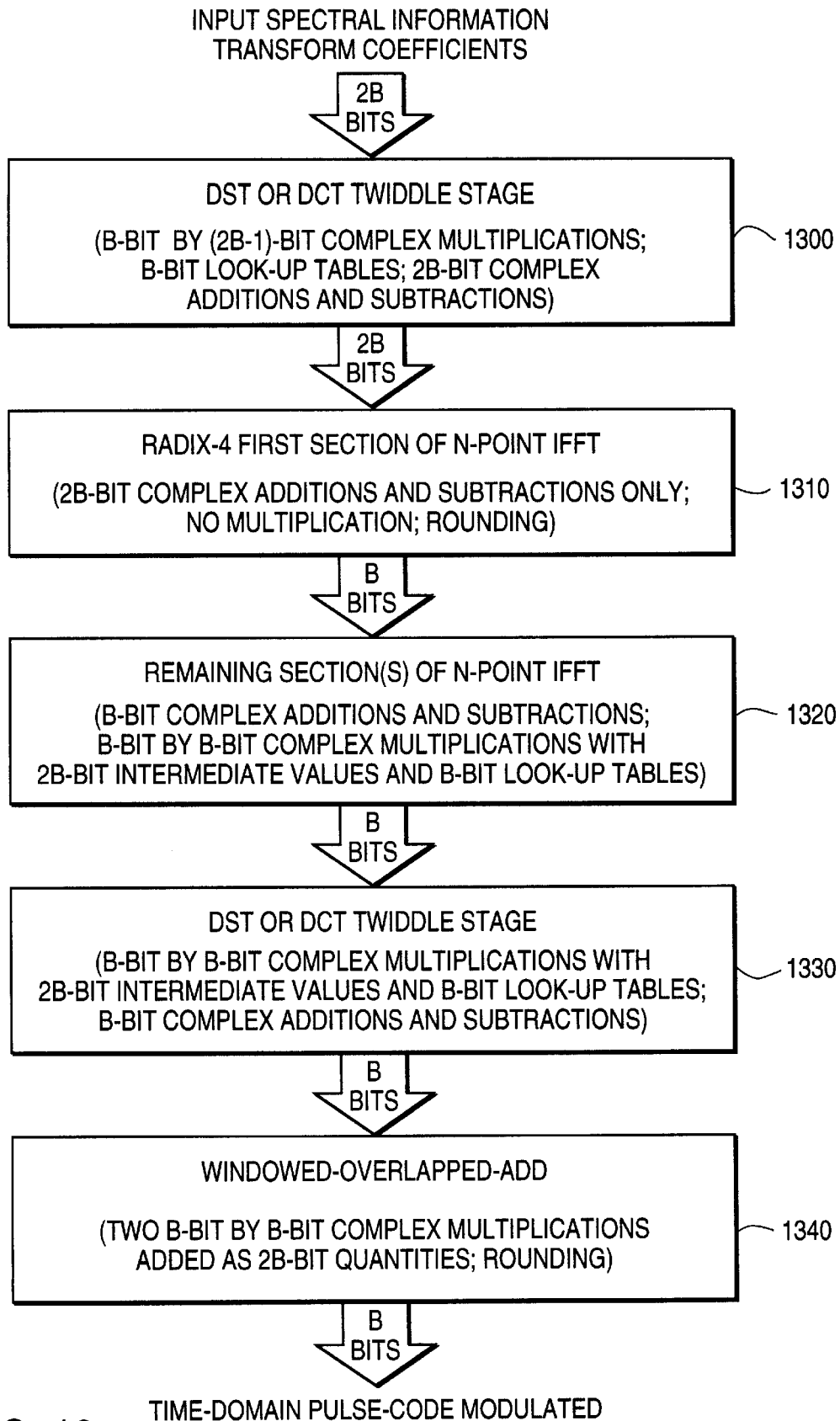
FIG. 13 shows an exemplary embodiment of a Time Domain Alias Cancellation (TDAC) transformation according to the present invention.

Turning now to FIG. 13, an exemplary embodiment of a Time Domain Alias Cancellation (TDAC) transformation according to the present invention is shown. Input spectral information, including transform coefficients, are input to either a Discrete Cosine Transform (DCT) or a Discrete Sine Transform (DST) first twiddle stage (or section) 1300. As shown in FIG. 13, the input spectral information, including the transform coefficients, are quantized to 2B bits. Preferably, the accuracy of the input data is at least 18 bits to prevent overflow during addition and subtraction operations. For example, for DSP applications the precision should be at least 18 bits. The operations performed on the input spectral information, including the transform coefficients, in either the DCT or the DST first twiddle stage 1300, may include 2B-bit complex additions and subtractions, as well as B-bit by (2B−1)-bit complex multiplications and the use of B-bit lookup tables.

As shown in FIG. 13, the 2B-bit data output from either the DCT or the DST first twiddle stage 1300 are input to a 2B-bit radix-4 section 1310 used as the first section of an N-point IFFT. As explained above, all of the IFFT twiddle factors $(W_N)^k$ for the radix-4 first section 1310 of the N-point IFFT are either ±1 or ±j. As in the exemplary embodiments shown in FIGS. 7, 9 and 11, the computations in the radix-4 first section 1310 of the N-point IFFT only involve complex additions and subtractions, and do not entail any multiplications, as in the case of a radix-4 first section of an N-point DIT FFT.

As shown in FIG. 13, data output from the radix-4 first section 1310 of the N-point IFFT are quantized, preferably by rounding, to B bits. The rounded B-bit data output from the radix-4 first section 1310 of the N-point IFFT are input to the remaining section(s) 1320 of the N-point IFFT, as shown in FIG. 13. The operations performed on the rounded B-bit data output from the radix-4 first section 1310 of the N-point IFFT may include B-bit complex additions and subtractions, as well as B-bit by B-bit complex multiplications, with accumulations of 2B-bit intermediate values, and the use of B-bit lookup tables for the twiddle factors $(W_N)^k$ for the remaining section(s) 1320 of the N-point IFFT.

As shown in FIG. 13, the B-bit samples output from the remaining section(s) 1320 of the N-point IFFT are input to either a DCT or a DST second twiddle stage (or section) 1330. Preferably, a DCT second twiddle stage (or section)

1330 may be used with a DCT first twiddle stage (or section) 1300. Alternatively, a DST second twiddle stage (or section) 1330 may be used with a DST first twiddle stage (or section) 1300. The operations performed, in either the DCT or the DST second twiddle stage 1330, on the B-bit samples output from the remaining section(s) 1320 of the N-point IFFT, may include B-bit complex additions and subtractions, as well as B-bit by B-bit complex multiplications, with accumulations of 2B-bit intermediate values, and the use of B-bit lookup tables.

As shown in FIG. 13, the B-bit samples output from either the DCT or the DST second twiddle stage (or section) 1330 are input to a Windowed-Overlapped-Add (WOLA) stage (or section) 1340. The operations performed in the WOLA stage (or section) 1340 may include two B-bit by B-bit complex multiplications (the windowing) that are added as 2B-bit quantities and then rounded to B-bits, B-bit complex additions and subtractions, as well as other B-bit by B-bit complex multiplications, with accumulations of 2B-bit intermediate values, and the use of B-bit lookup tables. As shown in FIG. 13, the B-bit time-domain pulse-code modulated samples are output from the WOLA stage (or section) 1340, available for further DSP applications.

Figure 14:
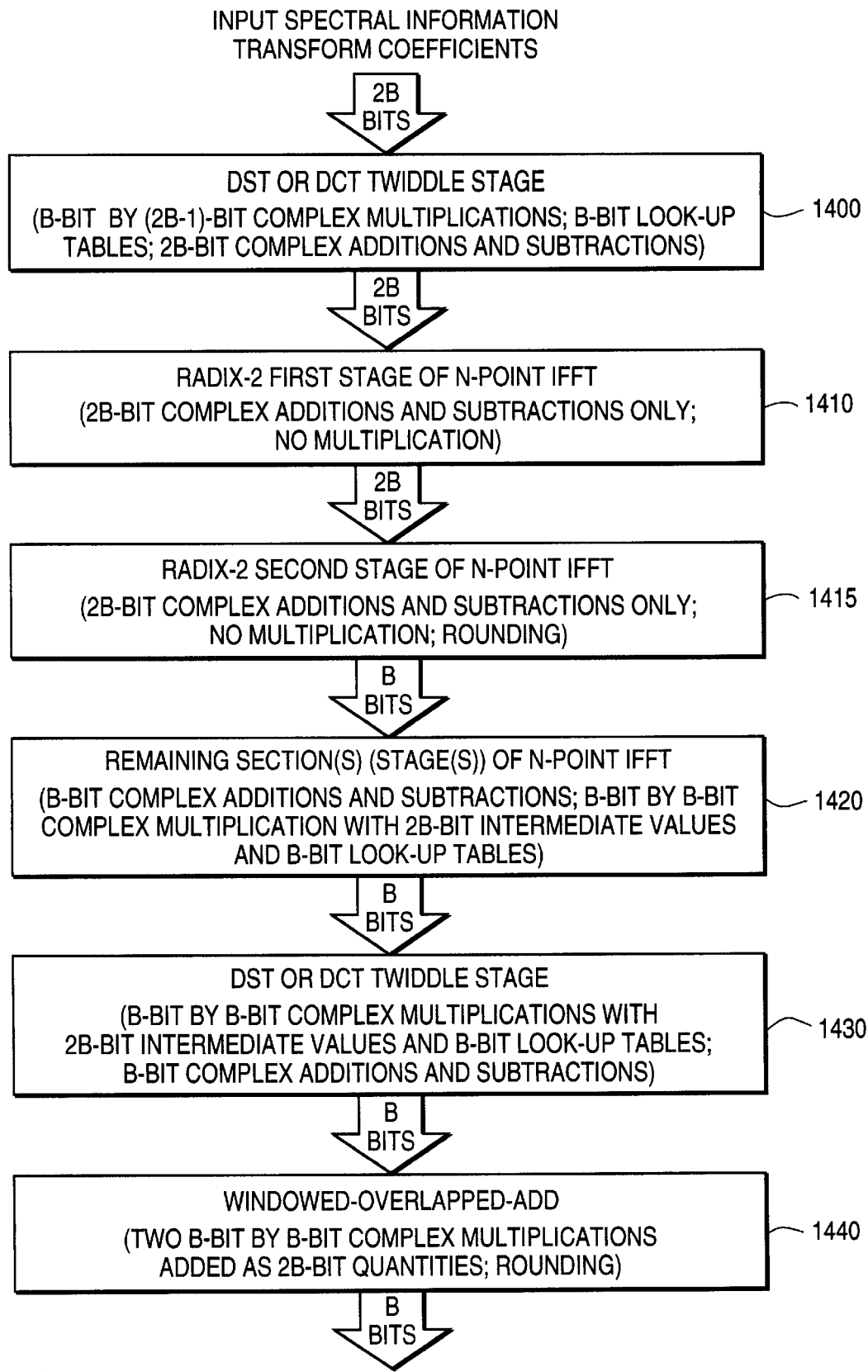
FIG. 14 shows another exemplary embodiment of a TDAC transformation according to the present invention.

Turning now to FIG. 14, another exemplary embodiment of a TDAC transformation according to the present invention is shown. Input spectral information, including transform coefficients, are input to either a Discrete Cosine Transform (DCT) or a Discrete Sine Transform (DST) first twiddle stage (or section) 1400. As shown in FIG. 14, the input spectral information, including the transform coefficients, are quantized to 2B bits. Preferably, the accuracy of the input data is at least 18 bits to prevent overflow during addition and subtraction operations. For example, for DSP applications the precision should be at least 18 bits. The operations performed on the input spectral information, including the transform coefficients, in either the DCT or the DST first twiddle stage 1400, may include 2B-bit complex additions and subtractions, as well as B-bit by (2B−1)-bit complex multiplications and the use of B-bit lookup tables.

As shown in FIG. 14, the 2B-bit data output from either the DCT or the DST first twiddle stage 1400 are input to 2B-bit radix-2 first and second section(s) (or stage(s)) 1410 and 1415 used as the first and second section(s) (or stage(s)) of an N-point IFFT. As explained above, all of the IFFT twiddle factors $(W_N)^k$ for the radix-2 first and second section(s) (or stage(s)) 1410 and 1415 of the N-point IFFT are either ±1 or ±j. As in the exemplary embodiments shown in FIGS. 8, 10 and 12, the computations in the radix-2 first and second section(s) (or stage(s)) 1410 and 1405 of the N-point IFFT only involve complex additions and subtractions, and do not entail any multiplications, as in the case of radix-2 first and second sections (or stages) of an N-point DIT FFT.

As shown in FIG. 14, data output from the radix-2 second section (or stage) 1415 of the N-point IFFT are quantized, preferably by rounding, to B bits. The rounded B-bit data output from the radix-2 second section (or stage) 1415 of the N-point IFFT are input to the remaining section(s) (or stage(s)) 1420 of the N-point IFFT, as shown in FIG. 14. The operations performed on the rounded B-bit data output from the radix-2 second section (or stage) 1415 of the N-point IFFT may include B-bit complex additions and subtractions, as well as B-bit by B-bit complex multiplications, with accumulations of 2B-bit intermediate values, and the use of B-bit lookup tables for the twiddle factors $(W_N)^k$ for the remaining section(s) (or stage(s)) 1420 of the N-point IFFT.

As shown in FIG. 14, the B-bit samples output from the remaining section(s) (or stage(s)) 1420 of the N-point IFFT are input to either a DCT or a DST second twiddle stage (or section) 1430. Preferably, a DCT second twiddle stage (or section) 1430 may be used with a DCT first twiddle stage (or section) 1400. Alternatively, a DST second twiddle stage (or section) 1430 may be used with a DST first twiddle stage (or section) 1400. The operations performed, in either the DCT or the DST second twiddle stage 1430, on the B-bit samples output from the remaining section(s) (or stage(s)) 1420 of the N-point IFFT, may include B-bit complex additions and subtractions, as well as B-bit by B-bit complex multiplications, with accumulations of 2B-bit intermediate values, and the use of B-bit lookup tables.

As shown in FIG. 14, the B-bit samples output from either the DCT or the DST second twiddle stage (or section) 1430 are input to a Windowed-Overlapped-Add (WOLA) stage (or section) 1440. The operations performed in the WOLA stage (or section) 1440 may include two B-bit by B-bit complex multiplications (the windowing) that are added as 2B-bit quantities and then rounded to B-bits, B-bit complex additions and subtractions, as well as other B-bit by B-bit complex multiplications, with accumulations of 2B-bit intermediate values, and the use of B-bit lookup tables. As shown in FIG. 14, the B-bit time-domain pulse-code modulated samples are output from the WOLA stage (or section) 1440, available for further DSP applications.

Figure 15:
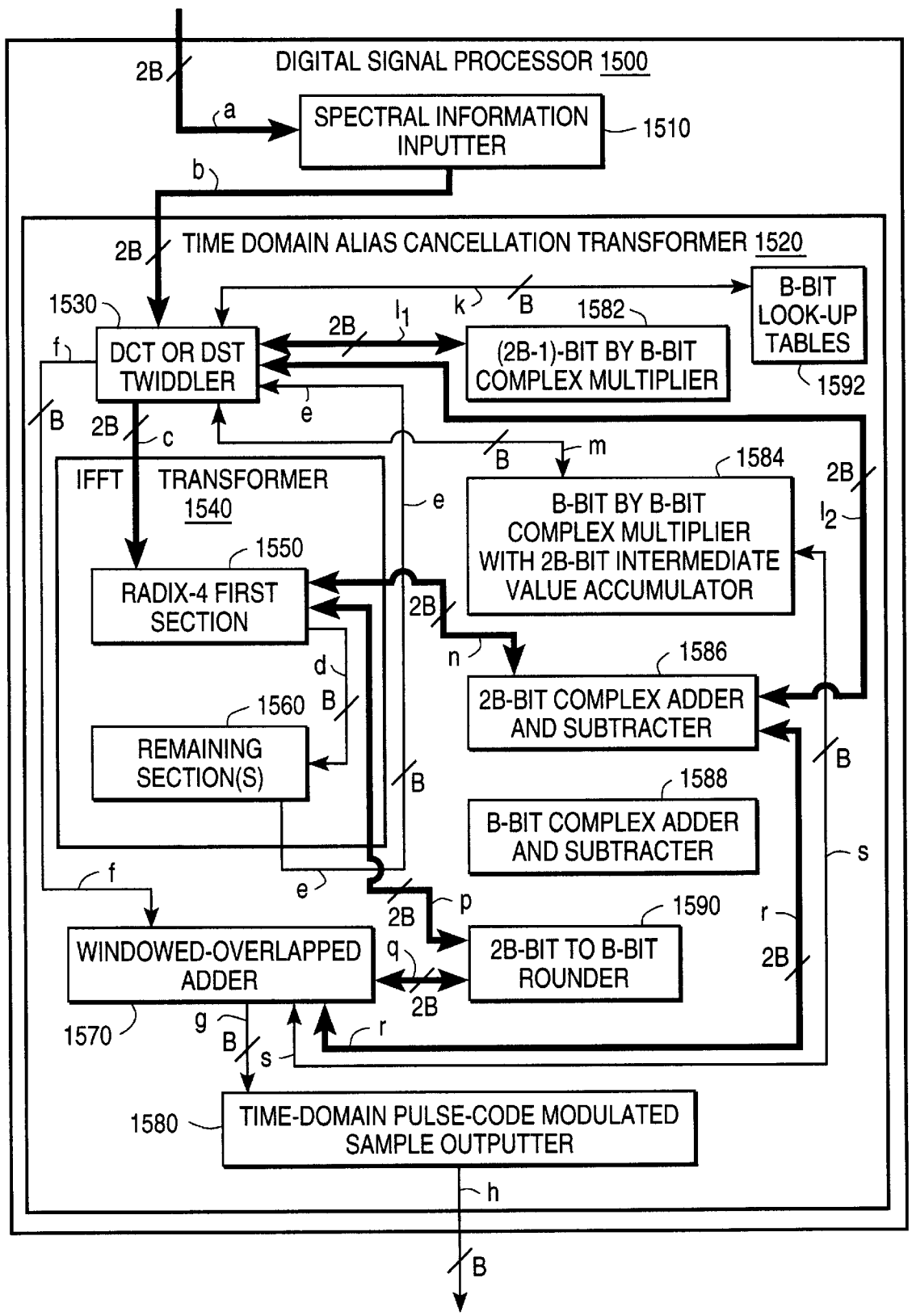
FIG. 15 shows an exemplary embodiment of a Digital Signal Processor (DSP) according to the present invention.

Turning now to FIG. 15, an exemplary embodiment of a Digital Signal Processor (DSP) 1500 according to the present invention is shown. The DSP 1500 may have a spectral information inputter 1510 receiving 2B-bit spectral information along connection a and inputting spectral data values to a Time Domain Alias Cancellation (TDAC) transformer 1520 along connection b. The TDAC transformer 1520 may have either a Discrete Cosine Transform (DCT) or a Discrete Sine Transform (DST) twiddler (or twiddle stage) 1530 receiving the 2B-bit spectral data values from the spectral information inputter 1510 along connection b and outputting 2B-bit DCT (or DST) twiddled data values to an Inverse Fast Fourier Transform (IFFT) transformer 1540 along connection c.

The IFFT transformer 1540 may have a radix-4 first section 1550 of an N-point IFFT receiving the 2B-bit DCT (or DST) twiddled data values output from the DCT (or DST) twiddler or twiddle stage 1530 along connection c and outputting B-bit rounded data values to the remaining section(s) 1560 of the N-point IFFT along connection d. The remaining section(s) 1560 of the N-point IFFT may receive the B-bit rounded data values output from the radix-4 first section 1550 of the N-point IFFT along connection d and may output the B-bit time-domain samples to either the DCT (or DST) twiddler or twiddle stage 1530 along connection e.

The DCT (or DST) twiddler or twiddle stage 1530 may receive the B-bit time-domain samples output from the remaining section(s) 1560 of the N-point IFFT along connection e and may output B-bit DCT (or DST) twiddled data values along connection f to a Windowed-Overlapped Adder (WOLA) 1570. The WOLA 1570 may receive the B-bit DCT (or DST) twiddled data values output from the DCT (or DST) twiddler or twiddle stage 1530 along connection f and may output B-bit windowed, overlapped and added time-domain pulse-code modulated (PCM) samples along connection g to a time-domain PCM sample outputter 1580. The PCM sample outputter 1580 may receive the B-bit windowed, overlapped and added time-domain PCM samples output from the WOLA 1570 along connection g and may output the B-bit windowed, overlapped and added time-domain PCM samples along connection h, with or without further digital signal processing, as shown in FIG. 15.

The TDAC transformer 1520 may also have a (2B−1)-bit by B-bit complex multiplier 1582, performing complex (2B−1)-bit by B-bit multiplications, a B-bit by B-bit complex multiplier 1584, performing complex B-bit by B-bit multiplications, preferably with an accumulator accumulating 2B-bit intermediate values, and a 2B-bit complex adder and subtracter 1586, performing complex 2B-bit additions and subtractions. The TDAC transformer 1520 may also have a B-bit complex adder and subtracter 1588, performing complex B-bit additions and subtractions, a 2B-bit to B-bit rounder 1590, rounding 2B-bit data values to B-bit data values, and one or more B-bit look-up tables 1592. The B-bit look-up tables 1592 are used by the DCT (or DST) twiddler or twiddle stage 1530 and by the remaining section(s) 1560 of the IFFT transformer 1540, as well as by the WOLA 1570, to perform their respective twiddling and windowing computations.

As shown in FIG. 15, the B-bit look-up tables 1592 may be connected to the DCT (or DST) twiddler or twiddle stage 1530 by a two-way B-bit connection k. Although not all of the two-way B-bit connections are shown in FIG. 15, for the sake of clarity, all of the elements 1530–1592 of the TDAC transformer 1520 may be connected to each other by two-way B-bit connections, such as connections k, m and s, for example, as shown in FIG. 15, preferably by a B-bit interconnection bus (not shown).

As shown in FIG. 15, the DCT (or DST) twiddler or twiddle stage 1530 may also be connected to the (2B−1)-bit by B-bit complex multiplier 1582 by a two-way 2B-bit connection $l_1$ and to the 2B-bit complex adder and subtracter 1586 by a two-way 2B-bit connection $l_2$. The twiddling operations that may be performed on the 2B-bit spectral information, input to the DCT (or DST) twiddler or twiddle stage 1530 by the spectral information inputter 1510 along connection b, including 2B-bit complex additions and subtractions, as well as (2B−1)-bit by B-bit complex multiplications and the use of the B-bit lookup tables 1592, may be implemented by using connection $l_2$ to the 2B-bit complex adder and subtracter 1586, connection $l_1$ to the (2B−1)-bit by B-bit complex multiplier 1582 and connection k to the look-up tables 1592, for example.

The DCT (or DST) twiddler or twiddle stage 1530 may also be connected to the B-bit by B-bit complex multiplier 1584 by a two-way B-bit connection m, as shown in FIG. 15. The twiddling operations that may be performed on the B-bit rounded data, input to the DCT (or DST) twiddler or twiddle stage 1530 from the remaining section(s) 1560 of the N-point IFFT of the IFFT transformer 1540 along connection e, including B-bit complex additions and subtractions, as well as B-bit by B-bit complex multiplications, with accumulations of 2B-bit intermediate values, and the use of the B-bit lookup tables 1592, may be implemented by using a connection (not shown) to the B-bit complex adder and subtracter 1588, connection m to the B-bit by B-bit complex multiplier 1584 and connection k to the look-up tables 1592, for example.

The radix-4 first section 1550 of the N-point IFFT of the IFFT transformer 1540 may be connected to the 2B-bit complex adder and subtracter 1586 by a two-way 2B-bit connection n and to the 2B-bit to B-bit rounder 1590 by a two-way 2B-bit connection p. The operations that may be performed on the 2B-bit twiddled data values, input to the radix-4 first section 1550 from the DCT (or DST) twiddler or twiddle stage 1530 along connection c, including 2B-bit complex additions and subtractions and the rounding of the resulting 2B-bit data values to B-bit data values, but not including any (2B−1)-bit by B-bit multiplications and not including any use of the B-bit lookup tables 1592, may be implemented by using connection n to the 2B-bit complex adder and subtracter 1586 and connections to the (2B−1)-bit to B-bit rounder 1592, for example. Alternative embodiments may have the radix-4 first section 1550 of the N-point IFFT of the IFFT transformer 1540 not be connected by the otherwise universal two-way B-bit connections, such as connections k, m and s, for example, as shown in FIG. 15, or by a B-bit interconnection bus (not shown), to any or all of the (2B−1)-bit by B-bit complex multiplier 1582, the B-bit by B-bit complex multiplier 1584, the B-bit complex adder and subtracter 1588 and the B-bit look-up tables 1592, since none of their respective operations may need to be performed by the radix-4 first section 1550.

The remaining section(s) 1560 of the N-point IFFT of the IFFT transformer 1540 may be connected to the B-bit complex adder and subtracter 1588, the B-bit by B-bit complex multiplier 1584 and the look-up tables 1592 by two-way B-bit connections (not shown). The operations that may be performed on the B-bit rounded data values, input to the remaining section(s) 1560 of the N-point IFFT of the IFFT transformer 1540 from the radix-4 first section 1550 along connection d, including B-bit complex additions and subtractions, as well as B-bit by B-bit complex multiplications, with accumulations of 2B-bit intermediate values, and the use of the B-bit lookup tables 1592, may be implemented by using the connections (not shown) to the B-bit complex adder and subtracter 1588, the B-bit by B-bit complex multiplier 1584 and the look-up tables 1592, for example.

The WOLA 1570 may be connected to the 2B-bit to B-bit rounder 1590 by a two-way 2B-bit connection q and to the 2B-bit complex adder and subtracter 1586 by a two-way 2B-bit connection r. The WOLA 1570 may also be connected to the B-bit by B-bit complex multiplier 1584 by a two-way B-bit connection s and to the look-up tables 1592 by a two-way B-bit connection (not shown). The windowing, overlapping and adding operations that may be performed on the B-bit twiddled data, input to the WOLA 1570 from the DCT (or DST) twiddler or twiddle stage 1530 along connection f, including two B-bit by B-bit complex multiplications (the windowing) that are added as 2B-bit quantities and then rounded to B-bits, B-bit complex additions and subtractions, as well as other B-bit by B-bit complex multiplications, with accumulations of 2B-bit intermediate values, and the use of B-bit lookup tables 1592, may be implemented by using connection s to the B-bit by B-bit complex multiplier 1584, connection r to the 2B-bit complex adder and subtracter 1586, connection q to the (2B−1)-bit to B-bit rounder 1592 and connections (not shown) to the B-bit complex adder and subtracter 1588 and to the look-up tables 1592, for example.

Figure 16:
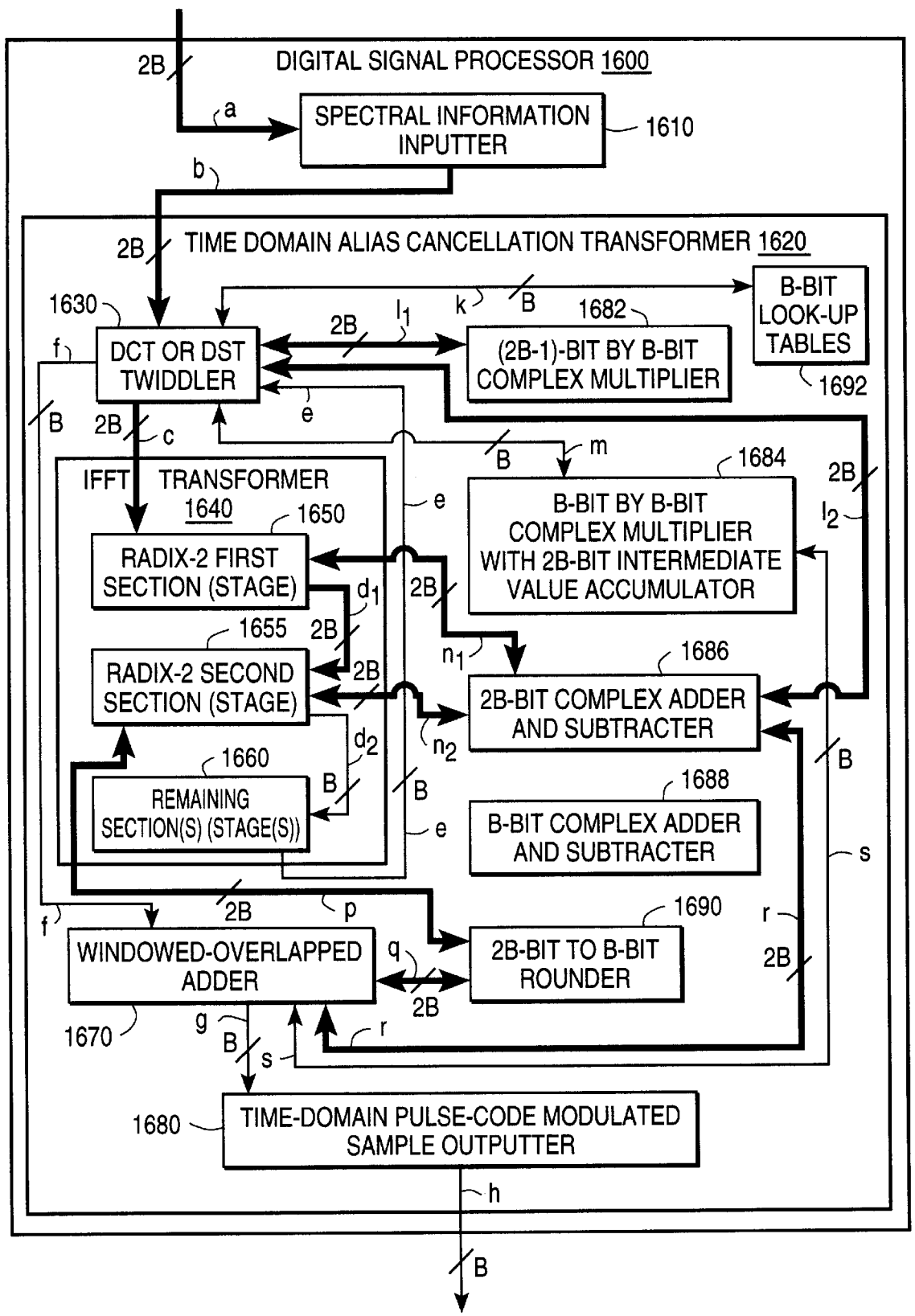
FIG. 16 shows another exemplary embodiment of a DSP according to the present invention.

Turning now to FIG. 16, another exemplary embodiment of a Digital Signal Processor (DSP) 1600 according to the present invention is shown. The DSP 1600 may have a spectral information inputter 1610 receiving 2B-bit spectral information along connection a and inputting spectral data values to a Time Domain Alias Cancellation (TDAC) transformer 1620 along connection b. The TDAC transformer 1620 may have either a Discrete Cosine Transform (DCT) or a Discrete Sine Transform (DST) twiddler (or twiddle stage) 1630 receiving the 2B-bit spectral data values from the spectral information inputter 1610 along connection b and outputting 2B-bit DCT (or DST) twiddled data values to an Inverse Fast Fourier Transform (IFFT) transformer 1640 along connection c.

The IFFT transformer 1640 may have a radix-2 first stage (or section) 1650 of an N-point IFFT receiving the 2B-bit DCT (or DST) twiddled data values output from the DCT (or DST) twiddler or twiddle stage 1630 along connection c and outputting 2B-bit data values to a radix-2 second stage (or section) 1655 of the N-point IFFT receiving the 2B-bit data values output from the radix-2 first stage (or section) 1650 along connection $d_1$ and outputting rounded B-bit data values to the remaining section(s) (or stage(s)) 1660 of the N-point IFFT along connection $d_2$. The remaining section(s) (or stage(s)) 1660 of the N-point IFFT may receive the B-bit rounded data values output from the radix-2 second section 1655 of the N-point IFFT along connection $d_2$ and may output the B-bit time-domain samples to either the DCT (or DST) twiddler or twiddle stage 1630 along connection e.

The DCT (or DST) twiddler or twiddle stage 1630 may receive the B-bit time-domain samples output from the remaining section(s) (or stage(s)) 1660 of the N-point IFFT along connection e and may output B-bit DCT (or DST) twiddled data values along connecion f to a Windowed-Overlapped Adder (WOLA) 1670. The WOLA 1670 may receive the B-bit DCT (or DST) twiddled data values output from the DCT (or DST) twiddler or twiddle stage 1630 along connection f and may output B-bit windowed, overlapped and added time-domain pulse-code modulated (PCM) samples along connection g to a time-domain PCM sample outputter 1680. The PCM sample outputter 1680 may receive the B-bit windowed, overlapped and added time-domain PCM samples along connection g and may output the B-bit windowed, overlapped and added time-domain PCM samples along connection h, with or without further digital signal processing, as shown in FIG. 16.

The TDAC transformer 1620 may also have a (2B−1)-bit by B-bit complex multiplier 1682, performing complex (2B−1)-bit by B-bit multiplications, a B-bit by B-bit complex multiplier 1684, performing complex B-bit by B-bit multiplications, preferably with an accumulator accumulating 2B-bit intermediate values, and a 2B-bit complex adder and subtracter 1686, performing complex 2B-bit additions and subtractions. The TDAC transformer 1620 may also have a B-bit complex adder and subtracter 1688, performing complex B-bit additions and subtractions, a 2B-bit to B-bit rounder 1690, rounding 2B-bit data values to B-bit data values, and one or more B-bit look-up tables 1692. The B-bit look-up tables 1692 are used by the DCT (or DST) twiddler or twiddle stage 1630 and by the remaining section(s) (stage(s)) 1660 of the IFFT transformer 1640, as well as by the WOLA 1670, to perform their respective twiddling and windowing computations.

As shown in FIG. 16, the B-bit look-up tables 1692 may be connected to the DCT (or DST) twiddler or twiddle stage 1630 by a two-way B-bit connection k. Although not all of the two-way B-bit connections are shown in FIG. 16, for the sake of clarity, all of the elements 1630–1692 of the TDAC transformer 1620 may be connected to each other by two-way B-bit connections, such as connections k, m and s, for example, as shown in FIG. 16, preferably by a B-bit interconnection bus (not shown).

As shown in FIG. 16, the DCT (or DST) twiddler or twiddle stage 1630 may also be connected to the (2B−1)-bit by B-bit complex multiplier 1682 by a two-way 2B-bit connection $l_1$ and to the 2B-bit complex adder and subtracter 1686 by a two-way 2B-bit connection $l_2$. The twiddling operations that may be performed on the 2B-bit spectral information, input to the DCT (or DST) twiddler or twiddle stage 1630 by the spectral information inputter 1610 along connection b, including 2B-bit complex additions and subtractions, as well as (2B−1)-bit by B-bit complex multiplications and the use of the B-bit lookup tables 1692, may be implemented by using connection $l_2$ to the 2B-bit complex adder and subtracter 1686, connection $l_1$ to the (2B−1)-bit by B-bit complex multiplier 1682 and connection k to the look-up tables 1692, for example.

The DCT (or DST) twiddler or twiddle stage 1630 may also be connected to the B-bit by B-bit complex multiplier 1684 by a two-way B-bit connection m, as shown in FIG. 16. The twiddling operations that may be performed on the B-bit rounded data, input to the DCT (or DST) twiddler or twiddle stage 1630 from the remaining section(s) (stage(s)) 1660 of the N-point IFFT of the IFFT tranformer 1640 along connection e, including B-bit complex additions and subtractions, as well as B-bit by B-bit complex multiplications, with accumulations of 2B-bit intermediate values, and the use of the B-bit lookup tables 1692, may be implemented by using a connection (not shown) to the B-bit complex adder and subtracter 1688, connection m to the B-bit by B-bit complex multiplier 1684 and connection k to the look-up tables 1692, for example.

The radix-2 first stage (or section) 1650 of the N-point IFFT of the IFFT tranformer 1640 may be connected to the 2B-bit complex adder and subtracter 1686 by a two-way 2B-bit connection $n_1$. The radix-2 second stage (or section) 1655 may be connected to the 2B-bit complex adder and subtracter 1686 by a two-way 2B-bit connection $n_2$ and to the 2B-bit to B-bit rounder 1690 by a two-way 2B-bit connection p. The operations that may be performed on the 2B-bit twiddled data values, input to the radix-2 first stage (or section) 1650 from the DCT (or DST) twiddler or twiddle stage 1630 along connection c, and that may be performed on the 2B-bit data values input to the radix-2 second stage (or section) 1655 from the radix-2 first stage (or section) 1650 along connection $d_1$, including 2B-bit complex additions and subtractions and the rounding of the resulting 2B-bit data values to B-bit data values, but not including any (2B−1)-bit by B-bit multiplications and not including any use of the B-bit lookup tables 1692, may be implemented by using connections $n_1$ and $n_2$ to the 2B-bit complex adder and subtracter 1686 and connection p to the (2B−1)-bit to B-bit rounder 1692, for example. Alternative embodiments may have one or both of the radix-2 first and second stages (or sections) 1650 and 1655 of the N-point IFFT of the IFFT tranformer 1640 not be connected by the otherwise universal two-way B-bit connections, such as connections k, m and s, for example, as shown in FIG. 16, or by a B-bit interconnection bus (not shown), to any or all of the (2B−1)-bit by B-bit complex multiplier 1682, the B-bit by B-bit complex multiplier 1684, the B-bit complex adder and subtracter 1688 and the B-bit look-up tables 1692, since none of their respective operations may need to be performed by either of the radix-2 first and second stages (or sections) 1650 and 1655.

The remaining section(s) (or stage(s)) 1660 of the N-point IFFT of the IFFT tranformer 1640 may be connected to the B-bit complex adder and subtracter 1688, the B-bit by B-bit complex multiplier 1684 and the look-up tables 1692 by two-way B-bit connections (not shown). The operations that may be performed on the B-bit rounded data values, input to the remaining section(s) 1660 of the N-point IFFT of the IFFT tranformer 1640 from the radix-2 second stage (or section) 1655 along connection $d_2$, including B-bit complex additions and subtractions, as well as B-bit by B-bit complex multiplications, with accumulations of 2B-bit intermediate values, and the use of the B-bit lookup tables 1692, may be implemented by using the connections (not shown) to the B-bit complex adder and subtracter 1688, the B-bit by B-bit complex multiplier 1684 and the look-up tables 1692, for example.

The WOLA 1670 may be connected to the 2B-bit to B-bit rounder 1690 by a two-way 2B-bit connection q and to the 2B-bit complex adder and subtracter 1686 by a two-way 2B-bit connection r. The WOLA 1670 may also be connected to the B-bit by B-bit complex multiplier 1684 by a two-way B-bit connection s and to the look-up tables 1692 by a two-way B-bit connection (not shown). The windowing, overlapping and adding operations that may be performed on the B-bit twiddled data, input to the WOLA 1670 from the DCT (or DST) twiddler or twiddle stage 1630 along connection f, including two B-bit by B-bit complex multiplications (the windowing) that are added as 2B-bit quantities and then rounded to B-bits, B-bit complex additions and subtractions, as well as other B-bit by B-bit complex multiplications, with accumulations of 2B-bit intermediate values, and the use of B-bit lookup tables 1692, may be implemented by using connection s to the B-bit by B-bit complex multiplier 1684, connection r to the 2B-bit complex adder and subtracter 1686, connection q to the (2B−1)-bit to B-bit rounder 1692 and connections (not shown) to the B-bit complex adder and subtracter 1688 and to the look-up tables 1692, for example.

Intel's MMX™ technology may be used to provide a processor-efficient implementation of Dolby Digital® for a PC based on a Pentium® processor with MMX™ technology. Such an implementation of Dolby Digital® using MMX™ technology provides both good execution speed and high-quality audio sound. Rather than using 32-bit floating-point numbers throughout the data path and only using MMX™ technology for bit manipulation, an implementation that would not be the most processor-efficient method, since MMX™ technology provides integer operations that are more processor-efficient than existing floating-point operations, the MMX™ instructions may be used as much as possible, particularly in the implementation of the IFFT. For example, such a processor-efficient implementation of Dolby Digital® for a PC based on a Pentium® processor with MMX™ technology is described in an article by the present inventors, James C. Abel and Michael A. Julier, "Implementation of a High-Quality Dolby Digital® Decoder Using MMX™ Technology," *Intel Technology Journal*, 3d Quarter 1997, from http://developer.intel.com/technology/itj/articles/art_3a.htm to http://developer.intel.com/technology/itj/articles/art_3i.htm and http://developer.intel.com/technology/itj/articles/art_3who.htm, the disclosure of which is hereby incorporated by reference.

We claim:

1. A method for computing a decimation-in-time Fast Fourier Transform of a sample, said method comprising:
    inputting first 2B-bit values representing said sample into a radix-4 first section of said decimation-in-time Fast Fourier Transform;
    performing complex 2B-bit integer additions and subtractions on said first 2B-bit values to form second 2B-bit values without performing a multiplication; and
    rounding second 2B-bit values to form B-bit values output from said radix-4 first section.

2. The method of claim 1, wherein said performing complex 2B-bit integer additions and subtractions includes using an implementation of a Single Instruction Multiple Data (SIMD) architecture.

3. The method of claim 2, wherein B=16.

4. The method of claim 1, wherein said B-bit values output from said radix-4 first section are input to a second section of said decimation-in-time Fast Fourier Transform.

5. The method of claim 4, wherein B=16.

6. A method for computing a decimation-in-time Fast Fourier Transform of a sample, said method comprising:
    inputting first 2B-bit values representing said sample into a radix-2 first stage of said decimation-in-time Fast Fourier Transform;
    performing first complex 2B-bit integer additions and subtractions on said first 2B-bit values to form second 2B-bit values output from said radix-2 first stage without performing a first multiplication;
    inputting said second 2B-bit values into a radix-2 second stage of said decimation-in-time Fast Fourier Transform;
    performing second complex 2B-bit integer additions and subtractions on said second 2B-bit values to form third 2B-bit values without performing a second multiplication; and
    rounding said third 2B-bit values to form B-bit values output from said radix-2 second stage.

7. The method of claim 6, wherein said performing first and second complex 2B-bit integer additions and subtractions include using an implementation of a Single Instruction Multiple Data (SIMD) architecture.

8. The method of claim 7, wherein B=16.

9. The method of claim 6, wherein said B-bit values output from said radix-2 second stage are input to a third stage of said decimation-in-time Fast Fourier Transform.

10. The method of claim 9, wherein B=16.

11. A method of Time Domain Alias Cancellation transforming spectral information into time domain, pulse-code modulated sample signals, said method comprising:
    inputting first 2B-bit values representing said spectral information into one of a Discrete Cosine Transform twiddle stage and a Discrete Sine Transform twiddle stage;
    performing complex (2B−1)-bit by B-bit multiplications on said first 2B-bit values using B-bit lookup tables for said one of said Discrete Cosine Transform twiddle stage and said Discrete Sine Transform twiddle stage to form second 2B-bit values output from said one of said Discrete Cosine Transform twiddle stage and said Discrete Sine Transform twiddle stage;
    inputting said second 2B-bit values into a radix-4 first section of an inverse Fast Fourier Transform;
    performing complex 2B-bit integer additions and subtractions on said second 2B-bit values to form third 2B-bit values without performing said complex (2B−1)-bit by B-bit multiplications; and
    rounding said third 2B-bit values to form B-bit values output from said radix-4 first section.

12. The method of claim 11, wherein said first 2B-bit values representing said spectral information are input into said Discrete Cosine Transform twiddle stage and said performing complex 2B-bit integer additions and subtractions includes using an implementation of a Single Instruction Multiple Data (SIMD) architecture.

13. The method of claim 12, wherein B=16.

14. The method of claim 11, wherein said first 2B-bit values representing said spectral information are input into said Discrete Cosine Transform twiddle stage and said B-bit values output from said radix-4 first section are input to a second section of said inverse Fast Fourier Transform.

15. The method of claim 14, wherein B=16.

16. A method of Time Domain Alias Cancellation transforming spectral information into time domain, pulse-code modulated sample signals, said method comprising:

inputting first 2B-bit values representing said spectral information into one of a Discrete Cosine Transform twiddle stage and a Discrete Sine Transform twiddle stage;

performing complex (2B−1)-bit by B-bit multiplications on said first 2B-bit values using B-bit lookup tables for said one of said Discrete Cosine Transform twiddle stage and said Discrete Sine Transform twiddle stage to form second 2B-bit values output from said one of said Discrete Cosine Transform twiddle stage and said Discrete Sine Transform twiddle stage;

inputting said second 2B-bit values into a radix-2 first stage of an inverse Fast Fourier Transform;

performing first complex 2B-bit integer additions and subtractions on said second 2B-bit values to form third 2B-bit values without performing said complex (2B−1)-bit by B-bit multiplications;

inputting said third 2B-bit values into a radix-2 second stage of said inverse Fast Fourier Transform;

performing second complex 2B-bit integer additions and subtractions on said third 2B-bit values to form fourth 2B-bit values output from said radix-2 second stage without performing said complex (2B−1)-bit by B-bit multiplications; and rounding said fourth 2B-bit values to form B-bit values output from said radix-2 second stage.

17. The method of claim 16, wherein said performing first and second complex 2B-bit integer additions and subtractions include using an implementation of a Single Instruction Multiple Data (SIMD) architecture.

18. The method of claim 17, wherein B=16.

19. The method of claim 16, wherein said B-bit values output from said radix-2 second stage are input to a third stage of said inverse Fast Fourier Transform.

20. A digital signal processor comprising:

a spectral information inputter for inputting spectral information; and a Time Domain Alias Cancellation transformer transforming said input spectral information into time domain, pulse-code modulated sample signals, said transformer including:

one of a Discrete Cosine Transform twiddler and a Discrete Sine Transform twiddler accepting as input first 2B-bit values representing said spectral information;

a complex multiplier performing complex (2B−1)-bit by B-bit multiplications on said first 2B-bit values using B-bit lookup tables for said one of said Discrete Cosine Transform twiddler and said Discrete Sine Transform twiddler to form second 2B-bit values output from said one of said Discrete Cosine Transform twiddler and said Discrete Sine Transform twiddler;

a radix-4 first section of an inverse Fast Fourier Transformer accepting as input said second 2B-bit values;

a complex 2B-bit adder and subtracter performing complex 2B-bit integer additions and subtractions on said second 2B-bit values to form third 2B-bit values without performing said complex (2B−1)-bit by B-bit multiplications; and a rounder, wherein said third 2B-bit values are rounded by said rounder to form B-bit values output from said radix-4 first section.

21. A digital signal processor comprising:

a spectral information inputter for inputting spectral information; and a Time Domain Alias Cancellation transformer transforming said input spectral information into time domain, pulse-code modulated sample signals, said transformer including:

one of a Discrete Cosine Transform twiddler and a Discrete Sine Transform twiddler accepting as input first 2B-bit values representing said spectral information;

a complex multiplier performing complex (2B−1)-bit by B-bit multiplications on said first 2B-bit values using B-bit lookup tables for said one of said Discrete Cosine Transform twiddler and said Discrete Sine Transform twiddler to form second 2B-bit values output from said one of said Discrete Cosine Transform twiddler and said Discrete Sine Transform twiddler;

a radix-2 first stage of an inverse Fast Fourier Transformer accepting as input said second 2B-bit values;

a complex 2B-bit adder and subtracter performing first complex 2B-bit integer additions and subtractions on said second 2B-bit values to form third 2B-bit values without performing said complex (2B−1)-bit by B-bit multiplications;

a radix-2 second stage of said inverse Fast Fourier Transformer accepting as input said third 2B-bit values; and a rounder, wherein said complex 2B-bit adder and subtracter performs second complex 2B-bit integer additions and subtractions on said third 2B-bit values to form fourth 2B-bit values without performing said complex (2B−1)-bit by B-bit multiplications, and said fourth 2B-bit values are rounded by said rounder to form B-bit values output from said radix-2 second stage.

22. A method for computing a decimation-in-time Fast Fourier Transform of a sample, said method comprising:

inputting first 2B-bit values representing said sample into a radix-4 first section of said decimation-in-time Fast Fourier Transform;

performing only complex 2B-bit integer additions and subtractions on said first 2B-bit values to form second 2B-bit values; and rounding said second 2B-bit values to form B-bit values output from said radix-4 first section.

23. The method of claim 22, wherein said performing complex 2B-bit integer additions and subtractions includes using an implementation of a Single Instruction Multiple Data (SIMD) architecture.

24. The method of claim 23, wherein B=16.

25. The method of claim 22, wherein said B-bit values output from said radix-4 first section are input to a second section of said decimation-in-time Fast Fourier Transform.

26. The method of claim 25, wherein B=16.

27. An article of manufacture comprising:

a computer useable medium having a computer readable program code embodied in said medium for causing a computer to compute a decimation-in-time Fast Fourier Transform of a sample, said computer readable program code in said article of manufacture including:

computer readable program code for causing said computer to input first 2B-bit values representing said sample into a radix-4 first section of said decimation-in-time Fast Fourier Transform;

computer readable program code for causing said computer to perform complex 2B-bit integer additions and subtractions on said first 2B-bit values to form second 2B-bit values without performing a multiplication; and computer readable program code for causing said computer to round said second 2B-bit values to form B-bit values output from said radix-4 first section.

28. The article of manufacture of claim 27, wherein said computer readable program code for causing said computer to perform complex 2B-bit integer additions and subtractions includes computer readable program code for causing said computer to use an implementation of a Single Instruction Multiple Data (SIMD) architecture.

29. The article of manufacture of claim 28, wherein B=16.

30. The article of manufacture of claim 27, including computer readable program code for causing said computer to input said B-bit values output from said radix-4 first section into a second section of said decimation-in-time Fast Fourier Transform.

31. The article of manufacture of claim 30, wherein B=16.

32. A program storage device readable by a machine, tangibly embodying a program of instructions executable by the machine to perform a method for computing a decimation-in-time Fast Fourier Transform of a sample, said method comprising:

inputting first 2B-bit values representing said sample into a radix-4 first section of said decimation-in-time Fast Fourier Transform;

performing complex 2B-bit integer additions and subtractions on said first 2B-bit values to form second 2B-bit values without performing a multiplication; and rounding said second 2B-bit values to form B-bit values output from said radix-4 first section.

33. The device of claim 32, wherein said performing complex 2B-bit integer additions and subtractions includes using an implementation of a Single Instruction Multiple Data (SIMD) architecture.

34. The device of claim 33, wherein B=16.

35. The device of claim 32, wherein said B-bit values output from said radix-4 first section are input to a second section of said decimation-in-time Fast Fourier Transform.

36. The device of claim 35, wherein B=16.

* * * * *